United States Patent
Axmon et al.

(10) Patent No.: US 10,123,356 B2
(45) Date of Patent: Nov. 6, 2018

(54) ROBUST SELECTION OF PRACH REPETITION LEVEL FOR MTC ENHANCED COVERAGE

(71) Applicant: Telefonaktiebolaget LM Ericsson (publ), Stockholm (SE)

(72) Inventors: Joakim Axmon, Kävlinge (SE); Bengt Lindoff, Bjärred (SE); Santhan Thangarasa, Vällingby (SE); Anders Wallén, Ystad (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 279 days.

(21) Appl. No.: 15/134,861

(22) Filed: Apr. 21, 2016

(65) Prior Publication Data

US 2016/0316491 A1    Oct. 27, 2016

Related U.S. Application Data

(60) Provisional application No. 62/153,339, filed on Apr. 27, 2015.

(51) Int. Cl.
*H04W 74/08* (2009.01)
*H04W 72/04* (2009.01)
(Continued)

(52) U.S. Cl.
CPC ......... *H04W 74/0833* (2013.01); *H04J 11/00* (2013.01); *H04L 1/1812* (2013.01);
(Continued)

(58) Field of Classification Search
CPC ...... H04W 74/0833; H04W 4/70; H04J 11/00
See application file for complete search history.

(56) References Cited

U.S. PATENT DOCUMENTS 6,751,444 B1   6/2004 Meiyappan
8,874,126 B2  10/2014 Jeong et al.
(Continued)

FOREIGN PATENT DOCUMENTS

CN   103650592 A   3/2014
EP    1928134 A2   6/2008
(Continued)

OTHER PUBLICATIONS

Author Unknown, "Technical Specification Group Radio Access Network; Radio Resource Control (RRC); Protocol Specification (Release 12)," Technical Specification 25.331, Version 12.5.0, 3GPP Organizational Partners, Mar. 2015, 2225 pages.
(Continued)

*Primary Examiner* — Siming Liu
(74) *Attorney, Agent, or Firm* — Withrow & Terranova, PLLC

(57) ABSTRACT

Systems and methods are disclosed herein that relate to determining a coverage scenario of a wireless device and determining an amount of resources to be used by the wireless device for transmission of a random access signal based on the coverage scenario of the wireless device. In some embodiments, a method of operation of a wireless device for random access to a cellular communications network comprises determining a number of resources needed for the wireless device to successfully decode an information block received from a radio access node. The method further comprises determining at least one of: a code rate and a transmit power used for transmission of the information block by the radio access node. The method further comprises determining an amount of resources to be used by the wireless device when transmitting a random access signal for a random access procedure based on the aforementioned information.

23 Claims, 8 Drawing Sheets

(51) Int. Cl.
H04J 11/00 (2006.01)
H04L 5/14 (2006.01)
H04L 1/18 (2006.01)
H04W 16/26 (2009.01)
H04W 4/70 (2018.01)

(52) U.S. Cl.
CPC .................. *H04L 5/14* (2013.01); *H04W 4/70* (2018.02); *H04W 16/26* (2013.01); *H04W 72/042* (2013.01); *H04W 72/0413* (2013.01)

(56) References Cited

U.S. PATENT DOCUMENTS

| | | | |
|---|---|---|---|
| 2004/0052230 | A1 | 3/2004 | Soliman |
| 2004/0125776 | A1 | 7/2004 | Haugli et al. |
| 2007/0010256 | A1 | 1/2007 | Klabunde et al. |
| 2007/0286155 | A1 | 12/2007 | Kaikkonen et al. |
| 2009/0042582 | A1 | 2/2009 | Wang et al. |
| 2009/0207826 | A1 | 8/2009 | Bitran et al. |
| 2010/0304738 | A1 | 12/2010 | Lim |
| 2010/0329211 | A1 | 12/2010 | Ou |
| 2011/0021154 | A1 | 1/2011 | Marinier et al. |
| 2011/0201333 | A1 | 8/2011 | Kwon et al. |
| 2012/0063302 | A1 | 3/2012 | Damnjanovic et al. |
| 2012/0088498 | A1 | 4/2012 | Xiao et al. |
| 2012/0282934 | A1 | 11/2012 | Simonsson et al. |
| 2013/0102309 | A1 | 4/2013 | Chande et al. |
| 2013/0157680 | A1 | 6/2013 | Morita et al. |
| 2013/0223416 | A1 | 8/2013 | Michel |
| 2015/0078264 | A1* | 3/2015 | Han .................. H04W 74/0833 370/329 |
| 2015/0092566 | A1 | 4/2015 | Balachandran et al. |
| 2015/0117233 | A1* | 4/2015 | Wong ..................... H04W 4/70 370/252 |
| 2015/0271763 | A1 | 9/2015 | Balachandran et al. |

FOREIGN PATENT DOCUMENTS

| | | |
|---|---|---|
| RU | 2358396 C2 | 6/2009 |
| WO | 2012093888 A2 | 7/2012 |
| WO | 2012173565 A1 | 12/2012 |
| WO | 2014077765 A1 | 5/2014 |
| WO | 2015012654 A1 | 1/2015 |
| WO | 2015116732 A1 | 8/2015 |

OTHER PUBLICATIONS

Author Unknown, "Technical Specification Group Radio Access Network; Evolved Universal Terrestial Radio Access (E-UTRA); Requirements for support of radio resource management (Release 8)," Technical Specification 36.133, Version 8.19.0, 3GPP Organizational Partners, Sep. 2012, 338 pages.
Author Unknown, "Technical Specification Group Radio Access Network; Evolved Universal Terrestrial Radio Access (E-UTRA); Physical layer procedures (Release 8)," Technical Specification 36.213, Version 8.8.0, 3GPP Organizational Partners, Sep. 2009, 77 pages.
Author Unknown, Technical Specification Group Radio Access Network; Evolved Universal Terrestrial Radio Access (E-UTRA); Radio Resource Control (RRC); Protocol specification (Release 8), Technical Specification 36.331, Version 8.17.0, 3GPP Organizational Partners, Jun. 2012, 215 pages.
Ericsson et al., "R1-124887: General considerations on coverage enhancements for MTC," 3rd Generation Partnership Project (3GPP), TSG-RAN WG1 #71, Nov. 12-16, 2012, 6 pages, New Orleans, USA.
Ericsson et al., "R1-124888: Required functionality for coverage enhancements for MTC," 3rd Generation Partnership Project (3GPP), TSG-RAN WG1 #71, Nov. 12-16, 2012, 4 pages, New Orleans, USA.

Non-Final Office Action for U.S. Appl. No. 14/441,479, dated Oct. 7, 2016, 27 pages.
Final Office Action for U.S. Appl. No. 14/441,479, dated Apr. 18, 2017, 29 pages.
Non-Final Office Action for U.S. Appl. No. 14/441,479, dated Oct. 6, 2017, 26 pages.
Extended European Search Report for European Patent Application No. 17164602.9, dated Jul. 25, 2017, 9 pages.
International Search Report and Written Opinion for PCT/SE2013/051335, dated Feb. 12, 2014, 10 pages.
Ericsson, "Tdoc R2-150456: Random access procedure for low complexity and coverage enhanced UEs," 3rd Generation Partnership Project (3GPP), TSG-RAN WG2 #89, Feb. 9-13, 2015, 7 pages, Athens, Greece.
NEC, "R2-151420: RAR for Rel-13 low-complexity UE and UE in enhanced coverage," 3rd Generation Partnership Project (3GPP), TSG RAN2 Meeting #89bis, Apr. 20-24, 2015, 3 pages, Bratislava, Slovakia.
RAN1, "R2-151008: LS on PRACH coverage enhancement," 3rd Generation Partnership Project (3GPP), TSG RAN WG2 Meeting #89bis, Apr. 20-24, 2015, 1 page, Bratislava, Slovakia.
Sharp, "R2-150148: Consideration on coverage enhanced RACH for Rel-13 MTC UEs," 3rd Generation Partnership Project (3GPP), TSG RAN WG2 Meeting #89, Feb. 9-13, 2015, 4 pages, Athens, Greece.
Non-Final Office Action for U.S. Appl. No. 14/390,649, dated Jul. 15, 2016, 21 pages.
International Search Report and Written Opinion for PCT/EP2016/059218, dated Jul. 18, 2016, 15 pages.
Final Office Action for U.S. Appl. No. 14/390,649, dated Dec. 16, 2016, 8 pages.
Advisory Action and Examiner-Initiated Interview Summary for U.S. Appl. No. 14/390,649, dated Apr. 10, 2017, 4 pages.
Non-Final Office Action for U.S. Appl. No. 14/390,649, dated Jul. 26, 2017, 22 pages.
Author Unknown, "Technical Specification Group Services and System Aspects; Service requirements for Machine-Type Communications (MTC); Stage 1 (Release 11)," Technical Specification 22.368, Version 11.6.0, 3GPP Organizational Partners, Sep. 2012, 21 pages.
Author Unknown, "Technical Specification Group Radio Access Network; Evolved Universal Terrestrial Radio Access (E-UTRA); Requirements for support of radio resource management (Release 12)," Technical Specification 36.133, Version 12.4.0, 3GPP Organizational Partners, Jul. 2014, 870 pages.
Author Unknown, "Technical Specification Group Radio Access Network; Study on provision of low-cost MTC UEs based on LTE; (Release 11)," Technical Report 36.888, Version 2.0.0, 3GPP Organizational Partners, Jun. 2012, 13 pages.
Ericsson, "R4-151491: Impact on RACH in enhanced coverage for MTC," 3rd Generation Partnership Project (3GPP), TSG RAN WG4 Meeting #74bis, Apr. 20-24, 2015, 4 pages, Rio de Janeiro, Brazil.
ETRI, "R1-150520: Feedback enhancements for high-order MU-MIMO," 3rd Generation Partnership Project (3GPP), TSG RAN WG1 Meeting #80, Feb. 9-13, 2015, 7 pages, Athens, Greece.
Huawei, et al., "R1-140026: Considerations on PRACH repetition levels and power adjustment of PRACH transmission," 3rd Generation Partnership Project (3GPP), TSG RAN WG1 Meeting #76, Feb. 10-14, 2014, 6 pages, Prague, Czech Republic.
RAN1, "R1-150920: LS on PRACH coverage enhancement," 3rd Generation Partnership Project (3GPP), TSG RAN WG1 Meeting #80, Feb. 9-13, 2015, 2 pages, Athens, Greece.
Vodafone, "RP-121441: Updated SID on: Provision of low-cost MTC UEs based on LTE," 3rd Generation Partnership Project (3GPP), TSG RAN Meeting #57, Sep. 4-7, 2012, 6 pages, Chicago, USA.
Substantive Examination for Russian Patent Application No. 2015122640/07, dated May 5, 2016, 12 pages.
International Search Report for PCT/SE2013/051334, dated Apr. 24, 2014, 3 pages.
International Preliminary Report on Patentability for International Patent Application No. PCT/SE2013/051334, dated May 28, 2015, 7 pages.

(56) References Cited

OTHER PUBLICATIONS

The First Office Action for Chinese Patent Application No. 201680024790.4, dated Aug. 3, 2018, 29 pages.

* cited by examiner

ROBUST SELECTION OF PRACH REPETITION LEVEL FOR MTC ENHANCED COVERAGE

RELATED APPLICATIONS

This application claims the benefit of provisional patent application Ser. No. 62/153,339, filed Apr. 27, 2015, the disclosure of which is hereby incorporated herein by reference in its entirety.

TECHNICAL FIELD

The present disclosure relates to a cellular communications network and more particularly relates to selection of a Physical Random Access Channel (PRACH) repetition level for a wireless device operating in the cellular communications network.

BACKGROUND

Low Complexity User Equipment (UE)

There is a need for efficient and cost-effective devices or terminals in cellular communications networks, especially in Machine-to-Machine (M2M) communications. In M2M communications, a Machine Type Communication (MTC) device (e.g., a smart meter, a signboard, a camera, a remote sensor, a laptop, an appliance, etc.) is expected to be of low cost and low complexity. A low complexity UE (which is also referred to herein as a User Equipment device (UE) or more generally as a wireless device) that is envisioned for M2M operation (i.e., that is envisioned as a MTC device) may implement one or more low cost features like smaller downlink and uplink maximum transport block size (e.g., 1000 bits) and/or reduced downlink channel bandwidth of 1.4 megahertz (MHz) for the data channel (e.g., for Physical Downlink Shared Channel (PDSCH)). With respect to reduced downlink channel bandwidth, the bandwidth may be reduced to 1.4 MHz for the data channel in Third Generation Partnership Project (3GPP) Long Term Evolution (LTE) Release 12 or reduced to 1.4 MHz for all uplink and downlink channels in 3GPP LTE Release 13. This means that the Radio Frequency (RF) bandwidth of the low complexity UE can be set to approximately 1.4 MHz. A low complexity UE may also comprise of a Half-Duplex Frequency Division Duplex (HD-FDD) and one or more of the following additional features: single receiver (one receiver) at the UE. The low complexity UE may also be referred to as a low cost UE.

Coverage Enhancing in MTC

The path loss between a MTC device, which is also referred to herein as a M2M device, and a base station can be very large in some scenarios such as when used as a sensor or metering device located in a remote location such as in a basement of a building. In such scenarios the reception of a signal from the base station is very challenging. For example, the path loss can be worse than 20 decibels (dB) compared to normal operation. In order to cope with such challenges, the coverage in the uplink and/or in the downlink has to be substantially enhanced. This is realized by employing one or a plurality of advanced techniques in the UE and/or in the radio network node (e.g., the base station) for enhancing the coverage. Some non-limiting examples of such advanced techniques are (but are not limited to) transmit power boosting, repetition of the transmitted signal, applying additional redundancy to the transmitted signal, use of an advanced/enhanced receiver, etc. In general, when employing such coverage enhancing techniques, the M2M device is regarded to be operating in coverage enhancing mode.

A low complexity UE (e.g., a UE with one receiver) may also be capable of supporting an enhanced coverage mode of operation.

Acquisition of Related System Information (SI)

The UEs are required to detect SI of neighboring cells in Evolved Universal Terrestrial Radio Access (E-UTRA). Examples of this SI are the Master Information Block (MIB) and the System Information Blocks (SIBs), where there are different types of SIBs, e.g., SIB1 and SIB2. The MIB is transmitted on the Physical Broadcast Channel (PBCH) while the SIBs are multiplexed into the PDSCH channel. The MIB is transmitted in subframe #0 with a periodicity of 40 milliseconds (ms) and four redundancy versions are transmitted within this period. SIB1 is transmitted on subframe #5 and has a periodicity of 80 ms.

The MIB, which is transmitted on the Physical Broadcast Channel (PBCH), contains a limited amount of SI which is necessary for the UE to read the SI. The MIB is transmitted on subframe #0 every 10 subframes. The MIB may include the following types of information:
  Information related to downlink bandwidth;
  Information related to Physical Hybrid Automatic Repeat Request (HARQ) Indication Channel (PHICH), where PHICH is necessary to be able to read the Physical Downlink Control Channel (PDCCH); and/or
  System Frame Number (SFN).

SIB1, on the other hand, contains the large part of the SI and it is transmitted on subframe #5 every 80 ms. In LTE, there are numerous types of SIBs that contain different types of information. The received SI is valid for a certain time and the network node notifies the UE about the change of SI using paging. By reading the paging messages, the UE knows exactly when the SI is expected to change and it also knows about the modification period boundary specified using SFN values. The SIBs are transmitted on the Downlink Shared Channel (DL-SCH) and indicated to the UE using the PDCCH and tag SI Radio Network Temporary Identifier (SI-RNTI). Examples of SIBs are SIB1, SIB2, and SIB3-SIB8, and their contents are as follows:
  SIB1 contains information related to the operator and information on whether the UE is allowed to camp on it, and subframe configurations as well as information about scheduling of other SIBs;
  SIB2 contains information necessary for the UE to access the cell, e.g. uplink cell bandwidth, parameters needed for random access, and parameters related to uplink power control; and
  SIB3-SIB8 contain mobility related information for, e.g., cell re-selection.

Systems and methods of improving the performance of low-complexity UEs such as MTC devices are desired.

SUMMARY

Systems and methods are disclosed herein that relate to determining a coverage scenario of a wireless device and determining an amount of resources to be used by the wireless device for transmission of a random access signal based on the coverage scenario of the wireless device. In some embodiments, a method of operation of a wireless device for random access to a cellular communications network comprises determining a number of resources needed for the wireless device to successfully decode an information block received from a radio access node of the cellular communications network. The method further comprises determining at least one of: (a) a code rate used for transmission of the information block by the radio access node and (b) a transmit power used by the radio access node for transmission of the information block. The method further comprises determining an amount of resources to be used by the wireless device when transmitting a random access signal for a random access procedure based on: (i) the number of resources needed for the wireless device to successfully decode the information block and (ii) the at least one of: (a) the code rate used for transmission of the information block by the radio access node and (b) the transmit power used by the radio access node for transmission of the information block. In this manner, the number of resources used for transmission of the random access signal is determined based on a reliable indication of the coverage scenario of the wireless device.

In some embodiments, determining the at least one of: (a) the code rate used for transmission of the information block by the radio access node and (b) the transmit power used by the radio access node for transmission of the information block comprises determining the code rate used for transmission of the information block by the radio access node. Further, determining the amount of resources to be used by the wireless device when transmitting the random access signal for the random access procedure comprises determining the amount of resources to be used by the wireless device when transmitting the random access signal for the random access procedure based on: (i) the number of resources needed for the wireless device to successfully decode the information block and (ii) the code rate used for transmission of the information block by the radio access node.

In some embodiments, determining the at least one of: (a) the code rate used for transmission of the information block by the radio access node and (b) the transmit power used by the radio access node for transmission of the information block comprises determining the transmit power used by the radio access node for transmission of the information block. Further, determining the amount of resources to be used by the wireless device when transmitting the random access signal for the random access procedure comprises determining the amount of resources to be used by the wireless device when transmitting the random access signal for the random access procedure based on: (i) the number of resources needed for the wireless device to successfully decode the information block and (ii) the transmit power used by the radio access node for transmission of the information block.

In some embodiments, determining the at least one of: (a) the code rate used for transmission of the information block by the radio access node and (b) the transmit power used by the radio access node for transmission of the information block comprises determining the code rate used for transmission of the information block by the radio access node and determining the transmit power used by the radio access node for transmission of the information block. Further, determining the amount of resources to be used by the wireless device when transmitting the random access signal for the random access procedure comprises determining the amount of resources to be used by the wireless device when transmitting the random access signal for the random access procedure based on: (i) the number of resources needed for the wireless device to successfully decode the information block and (ii) both (a) the code rate used for transmission of the information block by the radio access node and (b) the transmit power used by the radio access node for transmission of the information block.

In some embodiments, the amount of resources to be used by the wireless device comprises a number of Physical Resource Blocks (PRBs) to be used by the wireless device when transmitting the random access signal for the random access procedure. In some embodiments, the amount of resources to be used by the wireless device comprises a number of repetitions to be used by the wireless device when transmitting the random access signal for the random access procedure.

In some embodiments, the information block is a Master Information Block (MIB). In some embodiments, the information block is an information block that comprises System Information (SI).

In some embodiments, the number of resources needed for the wireless device to successfully decode the information block comprises a number of repetitions of the information block needed to successfully decode the information block. In some embodiments, the number of resources needed for the wireless device to successfully decode the information block comprises a number of Physical Broadcast Channel (PBCH) blocks needed to successfully decode the information block. In some embodiments, the number of resources needed for the wireless device to successfully decode the information block comprises a number of repetitions of the information block and a number of PBCH blocks needed to successfully decode the information block.

In some embodiments, the method further comprises performing the random access procedure, wherein performing the random access procedure comprises transmitting the random access signal using the amount of resources determined to be used by the wireless device when transmitting the random access signal for the random access procedure.

In some embodiments, the amount of resources determined to be used by the wireless device when transmitting the random access signal for the random access procedure comprises a number of repetitions, and the method further comprises applying the number of repetitions to thereby transmit the random access signal at a corresponding repetition level and continuing the random access procedure until a random access response is received.

In some embodiments, determining the amount of resources to be used by the wireless device when transmitting the random access signal for the random access procedure comprises determining the amount of resources to be used by the wireless device when transmitting the random access signal for the random access procedure based on a mapping from (I) the number of resources needed to successfully decode the information block and the at least one of the code rate and the transmit power to (II) the amount of resources to be used by the wireless device when transmitting the random access signal for the random access procedure. In some embodiments, the method further comprises performing an adaptation procedure that adapts the mapping based on an outcome of one or more instances of the random access procedure. Further, in some embodiments, performing the adaptation procedure comprises increasing the number of resources for the mapping upon determining that an average number of retransmissions needed to receive a random access response is greater than a first predefined threshold. In some embodiments, performing the adaptation procedure comprises decreasing the number of resources for the mapping upon determining that an average number of retransmissions needed to receive a random access response is less than a second predefined threshold.

In some embodiments, the wireless device is a User Equipment device (UE). In other embodiments, the wireless device is a Machine Type Communication (MTC) device.

Embodiments of a wireless device are also disclosed. In some embodiments, a wireless device for a cellular communications network comprises a transceiver, one or more processors, and memory that stores software executable by the one or more processors whereby the wireless device operates as follows. The wireless device determines a number of resources needed for the wireless device to successfully decode an information block received from a radio access node of the cellular communications network via the transceiver. The wireless device also determines at least one of: (a) a code rate used for transmission of the information block by the radio access node and (b) a transmit power used by the radio access node for transmission of the information block. The wireless device determine an amount of resources to be used by the wireless device when transmitting a random access signal for a random access procedure based on: (i) the number of resources needed for the wireless device to successfully decode the information block and (ii) the at least one of: (a) the code rate used for transmission of the information block by the radio access node and (b) the transmit power used by the radio access node for transmission of the information block.

In some embodiments, by execution of the software by the one or more processors, the wireless device is further operable to transmit, via the transceiver, the random access signal using the amount of resources determined to be used by the wireless device when transmitting the random access signal for the random access procedure.

In some embodiments, the wireless device determines the amount of resources to be used by the wireless device when transmitting the random access signal for the random access procedure based on a mapping from (I) the number of resources needed to successfully decode the information block and the at least one of the code rate and the transmit power to (II) the amount of resources to be used by the wireless device when transmitting the random access signal for the random access procedure. In some embodiments, by execution of the software by the one or more processors, the wireless device is further operable to perform an adaptation procedure that adapts the mapping based on an outcome of one or more instances of the random access procedure.

In some embodiments, a wireless device for a cellular communications network is adapted to determine a number of resources needed for the wireless device to successfully decode an information block received from a radio access node of the cellular communications network. The wireless device is further adapted to determine at least one of: (a) a code rate used for transmission of the information block by the radio access node and (b) a transmit power used by the radio access node for transmission of the information block. The wireless device is further adapted to determine an amount of resources to be used by the wireless device when transmitting a random access signal for a random access procedure based on: (i) the number of resources needed for the wireless device to successfully decode the information block and (ii) the at least one of: (a) the code rate used for transmission of the information block by the radio access node and (b) the transmit power used by the radio access node for transmission of the information block. In some embodiments, the wireless device is further adapted to perform the method of operation of a wireless device according to any of the embodiments described herein.

In some embodiments, a wireless device for a cellular communications network comprises means for determining a number of resources needed for the wireless device to successfully decode an information block received from a radio access node of the cellular communications network. The wireless device further comprises means for determining at least one of: (a) a code rate used for transmission of the information block by the radio access node and (b) a transmit power used by the radio access node for transmission of the information block. The wireless device further comprises means for determining an amount of resources to be used by the wireless device when transmitting a random access signal for a random access procedure based on: (i) the number of resources needed for the wireless device to successfully decode the information block and (ii) the at least one of: (a) the code rate used for transmission of the information block by the radio access node and (b) the transmit power used by the radio access node for transmission of the information block.

In some embodiments, a wireless device for a cellular communications network comprises a first module operable to determine a number of resources needed for the wireless device to successfully decode an information block received from a radio access node of the cellular communications network. The wireless device further comprises a second module operable to determine an amount of resources to be used by the wireless device when transmitting a random access signal for a random access procedure based on: (i) the number of resources needed for the wireless device to successfully decode the information block and (ii) at least one of: (a) a code rate used for transmission of the information block by the radio access node and (b) a transmit power used by the radio access node for transmission of the information block.

Embodiments of a non-transitory computer-readable medium are also disclosed. In some embodiments, a non-transitory computer-readable medium is provided, wherein the non-transitory computer-readable medium stores software instructions that when executed by one or more processors of a wireless device for a cellular communications network instruct the wireless device to determine a number of resources needed for the wireless device to successfully decode an information block received from a radio access node of the cellular communications network; determine at least one of: (a) a code rate used for transmission of the information block by the radio access node and (b) a transmit power used by the radio access node for transmission of the information block; and determine an amount of resources to be used by the wireless device when transmitting a random access signal for a random access procedure based on: (i) the number of resources needed for the wireless device to successfully decode the information block and (ii) the at least one of: (a) the code rate used for transmission of the information block by the radio access node and (b) the transmit power used by the radio access node for transmission of the information block.

In some embodiments, a method of operation of a wireless device for random access to a cellular communications network comprises determining an amount of resources to be used by the wireless device when transmitting a random access signal for a random access procedure based on a mapping between one or more parameters and the amount of resources. The method further comprises performing the random access procedure, wherein performing the random access procedure comprises transmitting the random access signal using the amount of resources determined to be used by the wireless device when transmitting the random access signal for the random access procedure. The method further comprises performing an adaptation procedure that adapts the mapping based on outcomes of one or more instances of the random access procedure performed by the wireless device.

In some embodiments, the amount of resources to be used by the wireless device comprises a number of PRBs to be used by the wireless device when transmitting the random access signal for the random access procedure. In some embodiments, the amount of resources to be used by the wireless device comprises a number of repetitions to be used by the wireless device when transmitting the random access signal for the random access procedure.

In some embodiments, the one or more parameters comprise a number of resources needed for the wireless device to successfully decode an information block received from a radio access node of the cellular communications network. In some embodiments, the information block is a MIB. In some embodiments, the information block is an information block that comprises SI. In some embodiments, the number of resources needed for the wireless device to successfully decode the information block comprises a number of repetitions of the information block needed to successfully decode the information block. In some embodiments, the number of resources needed for the wireless device to successfully decode the information block comprises a number of PBCH blocks needed to successfully decode the information block. In some embodiments, the number of resources needed for the wireless device to successfully decode the information block comprises a number of repetitions of the information block and a number of PBCH blocks needed to successfully decode the information block.

In some embodiments, the one or more parameters comprise a code rate used for transmission of the information block by the radio access node. In some embodiments, the one or more parameters comprise a transmit power used by the radio access node for transmission of the information block.

In some embodiments, performing the adaptation procedure comprises increasing the number of resources for the mapping upon determining that an average number of retransmissions needed to receive a random access response is greater than a first predefined threshold. In some embodiments, performing the adaptation procedure comprises decreasing the number of resources for the mapping upon determining that an average number of retransmissions needed to receive a random access response is less than a second predefined threshold.

In some embodiments, a wireless device for a cellular communications network comprises a transceiver, one or more processors, and memory that stores software executable by the one or more processors whereby the wireless device operates as follows. The wireless device determines an amount of resources to be used by the wireless device when transmitting a random access signal for a random access procedure based on a mapping between one or more parameters and the amount of resources. The wireless device also performs the random access procedure, wherein performing the random access procedure comprises transmitting, via the transceiver, the random access signal using the amount of resources determined to be used by the wireless device when transmitting the random access signal for the random access procedure. The wireless device also performs an adaptation procedure that adapts the mapping based on outcomes of one or more instances of the random access procedure performed by the wireless device.

In some embodiments, a wireless device for a cellular communications network is adapted to determine an amount of resources to be used by the wireless device when transmitting a random access signal for a random access procedure based on a mapping between one or more parameters and the amount of resources. The wireless device is further adapted to perform the random access procedure, wherein performing the random access procedure comprises transmitting the random access signal using the amount of resources determined to be used by the wireless device when transmitting the random access signal for the random access procedure. The wireless device is further adapted to perform an adaptation procedure that adapts the mapping based on outcomes of one or more instances of the random access procedure performed by the wireless device. In some embodiments, the wireless device is further adapted to perform the method of operation of a wireless device according to any of the embodiments described herein.

In some embodiments, a wireless device for a cellular communications network comprises means for determining an amount of resources to be used by the wireless device when transmitting a random access signal for a random access procedure based on a mapping between one or more parameters and the amount of resources. The wireless device further comprises means for performing the random access procedure, wherein performing the random access procedure comprises transmitting the random access signal using the amount of resources determined to be used by the wireless device when transmitting the random access signal for the random access procedure. The wireless device further comprises means for performing an adaptation procedure that adapts the mapping based on outcomes of one or more instances of the random access procedure performed by the wireless device.

In some embodiments, a wireless device for a cellular communications network comprises a first module operable to determine an amount of resources to be used by the wireless device when transmitting a random access signal for a random access procedure based on a mapping between one or more parameters and the amount of resources. The wireless device further comprises a second module operable to perform the random access procedure, wherein performing the random access procedure comprises transmitting the random access signal using the amount of resources determined to be used by the wireless device when transmitting the random access signal for the random access procedure. The wireless device further comprises a third module operable to perform an adaptation procedure that adapts the mapping based on outcomes of one or more instances of the random access procedure performed by the wireless device.

Embodiments of a non-transitory computer-readable medium are also disclosed. In some embodiments, a non-transitory computer-readable medium is provided, wherein the non-transitory computer-readable medium stores software instructions that when executed by one or more processors of a wireless device for a cellular communications network instruct the wireless device to: determine an amount of resources to be used by the wireless device when transmitting a random access signal for a random access procedure based on a mapping between one or more parameters and the amount of resources; perform the random access procedure, wherein performing the random access procedure comprises transmitting the random access signal using the amount of resources determined to be used by the wireless device when transmitting the random access signal for the random access procedure; and perform an adaptation procedure that adapts the mapping based on outcomes of one or more instances of the random access procedure performed by the wireless device.

Embodiments of a computer program are also disclosed. In some embodiments, a computer program is provided, wherein the computer program comprises instructions which, when executed on at least one processor, cause the at least one processor to carry out the method of operation of a wireless device according to any of the embodiments described herein. In some embodiments, a carrier containing the aforementioned computer program is provided, wherein the carrier is one of an electronic signal, an optical signal, a radio signal, or a computer readable storage medium.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
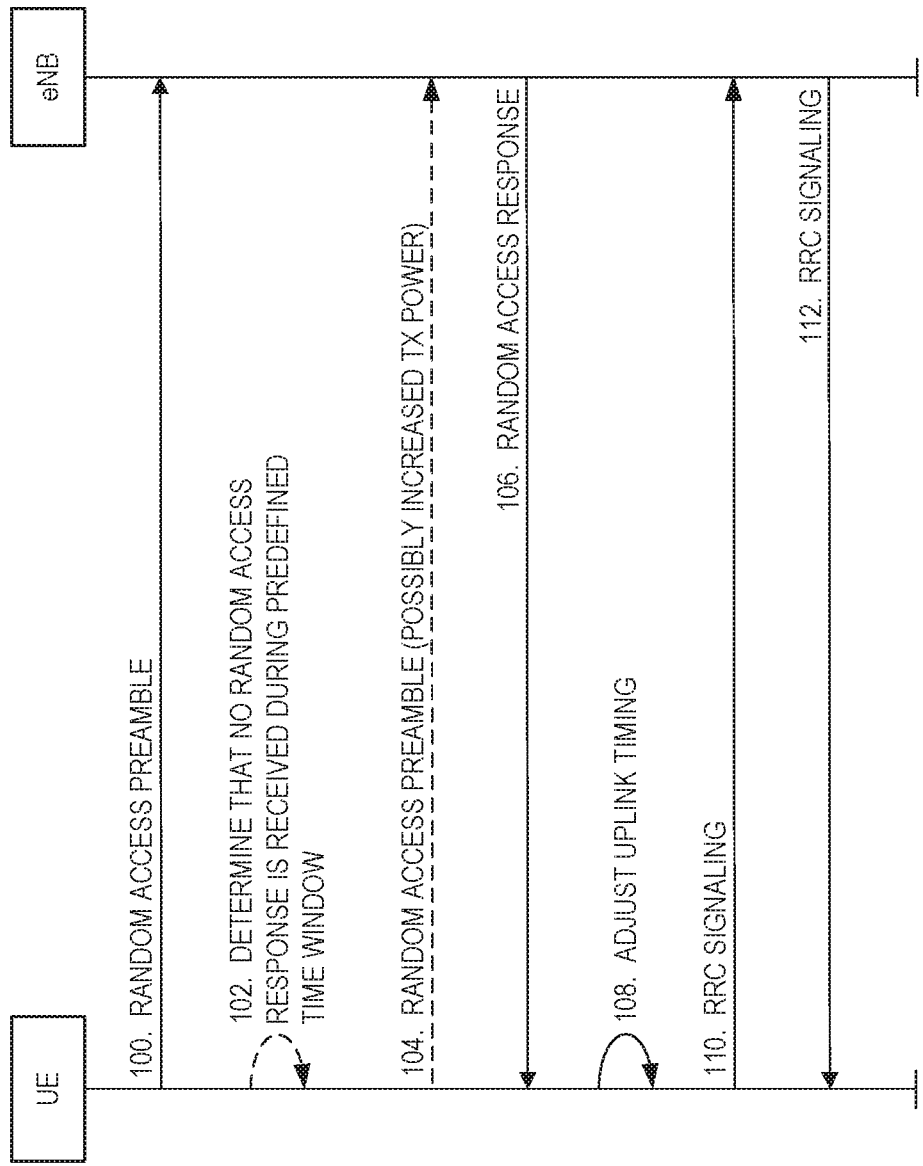
FIG. 1 illustrates the conventional random access procedure in a Third Generation Partnership Project (3GPP) Long Term Evolution (LTE) network.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Radio Node:

As used herein, a "radio node" is either a radio access node or a wireless device.

Radio Access Node:

As used herein, a "radio access node" is any node in a radio access network of a cellular communications network that operates to wirelessly transmit and/or receive signals. Some examples of a radio access node include, but are not limited to, a base station (e.g., an enhanced or evolved Node B (eNB) in a Third Generation Partnership Project (3GPP) Long Term Evolution (LTE) network), a high-power or macro base station, a low-power base station (e.g., a micro base station, a pico base station, a home eNB, or the like), and a relay node.

Core Network Node:

As used herein, a "core network node" is any type of node in a Core Network (CN). Some examples of a core network node include, e.g., a Mobility Management Entity (MME), a Packet Data Network (PDN) Gateway (P-GW), a Service Capability Exposure Function (SCEF), or the like.

Wireless Device:

As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network, a low-complexity UE (e.g., a Machine Type Communication (MTC) device), or the like.

Network Node:

As used herein, a "network node" is any node that is either part of the radio access network or the CN of a cellular communications network/system.

MTC Device:

As used herein, a MTC device is a type of wireless device and, in particular, a type of low-complexity UE that performs MTC. MTC devices are also referred to herein as Machine-to-Machine (M2M) devices.

Note that the description given herein focuses on a 3GPP LTE cellular communications system and, as such, 3GPP LTE terminology or terminology similar to 3GPP LTE terminology is oftentimes used. However, the concepts disclosed herein are not limited to LTE or a 3GPP system.

Note that, in the description herein, reference may be made to the term "cell;" however, particularly with respect to Fifth Generation (5G) concepts, beams may be used instead of cells and, as such, it is important to note that the concepts described herein are equally applicable to both cells and beams.

In Release 13 of the 3GPP Evolved Universal Terrestrial Radio Access (E-UTRA) standard, a class of MTC devices that are capable of operating outside the normal coverage, in so called Enhanced Coverage (EC) mode has been defined. In some technical specifications, normal coverage may also interchangeably be referred to as Coverage Enhancement (CE) mode A and EC mode may also interchangeably be referred to as CE mode B. Devices operating in EC mode shall be able to receive and successfully decode broadcasts and unicast transmissions at 15-20 decibels (dB) lower Signal-to-Noise Ratio (SNR) than currently specified for legacy devices (i.e., UE and MTC devices fulfilling the standard up to and including 3GPP E-UTRA Release12). The UE and MTC devices shall also be capable of measuring Reference Signal Received Power (RSRP) of a serving cell and neighbor cells under requirements on measurement accuracy. The acceptable tolerance is, depending on frequency band, under consideration but will most likely be on par or looser than the tolerances for UE category 0 introduced in 3GPP E-UTRA Release12; e.g., RSRP tolerance of ±7 dB for Ês/Iot≥−6 dB at low power levels (up to −70 decibel-milliwatts (dBm) over the received bandwidth) and ±9 dB at high power levels (between −70 and −50 dBm over the received bandwidth); see Table 9.1.13-1.1 from 3GPP Technical Specification (TS) 36.133 V12.4.0 below.

In this regard, FIG. 1 illustrates the conventional random access procedure in 3GPP LTE. As illustrated, after synchronizing to the downlink timing, the UE transmits a random access preamble (step 100). The transmission of the random access preamble enables the eNB to be aware of the random access attempt and to estimate the delay between the eNB and the UE. The time-frequency resource on which the random access preamble is transmitted is referred to as the PRACH. The PRACH resources that are available for use for random access in the cell are broadcast by the eNB as

TABLE 9.1.13.1-1

| RSRP Intra frequency absolute accuracy for UE category 0 | | | | | | |
|---|---|---|---|---|---|---|
| Accuracy | | | Conditions | | | |
| Normal condition | Extreme condition | Ês/Iot | | $Io^{Note\ 1}$ range | | |
| | | | | Minimum Io | | Maximum Io |
| dB | dB | dB | E-UTRA operating band groups$^{Note\ 3}$ | dBm/15 kHz$^{Note\ 2}$ | dBm/BW$_{Channel}$ | dBm/BW$_{Channel}$ |
| ±7 | ±10 | ≥−6 dB | FDD_A, TDD_A | −121 | N/A | −70 |
| | | | FDD_C, TDD_C | −120 | N/A | −70 |
| | | | FDD_D | −119.5 | N/A | −70 |
| | | | FDD_E, TDD_E | −119 | N/A | −70 |
| | | | FDD_F | −118.5 | N/A | −70 |
| | | | FDD_G | −118 | N/A | −70 |
| | | | FDD_H | −117.5 | N/A | −70 |
| | | | FDD_N | −114.5 | N/A | −70 |
| ±9 | ±12 | ≥−6 dB | FDD_A, TDD_A, FDD_C, TDD_C, FDD_D, FDD_E, TDD_E, FDD_F, FDD_G, FDD_H, FDD_N | N/A | −70 | −50 |

$^{Note\ 1}$Io is assumed to have constant EPRE across the bandwidth.
$^{Note\ 2}$The condition level is increased by Δ>0, when applicable, as described in Sections B.4.2 and B.4.3.
$^{Note\ 3}$E-UTRA operating band groups are as defined in Section 3.5.

The requirements are set based on the assumption on that devices of the class UE category 0 are using a single receiver antenna, and the same assumption applies for low-cost MTC devices in enhanced coverage; however, since a MTC-EC (MTC-EC) device is to operate at an even lower Signal-to-Interference plus Noise Ratio (SINR) than specified for UE category 0, the tolerance, for some frequency bands, will be even larger than ±7 dB for Ês/Iot←−6 dB, not for non-linearity as in the case for high power but for the relatively increased noise level.

Enhanced coverage also puts stress on the uplink communication since the transmissions by the UE or MTC device will be equally hard for the network node to receive and successfully decode. The network node has an advantage since it is scheduling the MTC device and hence knows when MTC transmissions are expected, but there is one exception: random access.

In this regard, WO 2015/116732 (hereinafter "the '732 Publication") describes coverage enhancement of channels in a wireless communication system such as LTE and LTE-Advanced (LTE-A). Among other things, the '732 Publication teaches that, if a Wireless Transmit/Receive Unit (WTRU) successfully receives the Master Information Block (MIB) using at least one repetition of the Physical Broadcasts Channel (PBCH) in a radio frame, the WTRU may transmit a Physical Random Access Channel (PRACH) preamble using a CE mode of operation. The CE mode of operation may be a mode of operation that uses repetitions. However, using the fact that the WTRU required repetitions to successfully receive the MIB as taught by the '732 Publication is not always a reliable indication of the coverage scenario of the WTRU.

part of the System Information Block (SIB) SIB2. The UE selects the random access preamble to transmit in step 100. For contention-based random access, the UE randomly selects one random access preamble from one of two preamble sets. For contention-free random access, the random access preamble transmitted by the UE is explicitly indicated from the eNB.

After transmitting the random access preamble, the UE waits to receive a random access response. If the UE determines that it has not received a random access response within a predefined time window (step 102), the UE optionally re-transmits the random access preamble (step 104). This re-transmission may use, e.g., a higher transmit power. Upon detection of the random access preamble transmitted by the UE, the eNB estimates the delay between the eNB and the UE and transmits a random access response to the UE (step 106). The random access response includes a timing advance command to the UE to adjust the transmit timing for the uplink from the UE. The UE and the eNB then use Radio Resource Control (RRC) signaling to complete the random access procedure (e.g., to send an identity of the UE to the eNB and to send a contention-resolution message from the eNB to the UE) (steps 110 and 112).

With respect to MTC devices, in order to facilitate reliable communication in an enhanced coverage mode of operation, repetitions of transmissions are planned, thereby improving the probability of successful decoding. For instance, the random access procedure is intended to rely on repetitions, where the MTC device is to transmit the random access preamble (i.e., the PRACH preamble) multiple times (e.g., in step 100 of FIG. 1 the random access preamble is repeated multiple times), where the number of repetitions depends on the experienced coverage. Note, however, that the present disclosure is not limited to the use of the conventional PRACH preamble for the multiple repetitions; rather, a new or modified PRACH preamble (e.g., a longer PRACH preamble that occupies more time/frequency resources than the conventional PRAACH preamble) may be used. The MTC device is to determine whether it is in normal coverage or EC where, for the latter, up to three different zones with respect to SNR are to be distinguished. The ambition is to improve the random access procedure without draining the wireless device's battery or random access capacity by having more repetitions than necessary.

At initial access, a wireless device first detects the cell and then reads the MIB and two SIBs (SIB1 and SIB2) in order to acquire the information needed for executing the random access procedure.

In regard to classification of the coverage scenario of a MTC device or more generally a UE, two proposals have been considered for standardization:

RSRP-based classification of coverage scenario, and

Cell detection-based classification of coverage scenario. There are issues with both proposals relating to tolerances and diversity of MTC implementations. For RSRP-based detection, the tolerance of (at least) ±7 dB causes an identical uncertainty in the classification of coverage scenario, even making it challenging for the wireless device to determine whether it should operate in normal or EC mode. Therefore, it is difficult to robustly deduce the appropriate coverage zone solely based on RSRP measurements. Moreover, there is no incentive to secure an as-good-as-possible measurement performance; as long as the wireless device meets the standard and potential customer and operator requirements, low complexity is favored before more accurate measurements. For a cell detection time-based approach, the main problem is that there are traditionally two main strategies adopted by UE vendors: either search often and shallow and by that way identify a new cell when it becomes strong enough to report or monitor for a potential handover, or search sparsely but deeply to detect the same neighbor cell earlier, at a lower level, well before it comes into the SINR range when it is to be reported or monitored for handover. The cell detection time becomes very different for the two approaches, and hence it is not suitable to use for classification of the coverage scenario. One further complication is that measurement accuracy and tolerances only apply for connected mode operation, but when the MTC device is carrying out the initial access, it is in idle mode. Therefore, it may be beneficial to use other means for robustly determining the number of repetitions of PRACH preambles to use in the random access procedure. Even if the communication standard postulates that a particular method be used, it may be beneficial to additionally or alternatively use other methods that provide better accuracy, given that these methods do not have an outcome that would not be possible to achieve with the postulated methods. A better accuracy increases the likelihood of the appropriate number of repetitions being used directly, thus both saving network resources and reducing the energy consumption in the wireless device.

Systems and methods are disclosed herein that relate to determining a coverage scenario of a wireless device and determining an amount of resources to be used by the wireless device for transmission of a random access signal based on the coverage scenario of the wireless device. In particular, in some embodiments, in order to determine its coverage scenario, the wireless device determines a number of resources needed to successfully decode an information block received by the wireless device from a radio access node of a cellular communications network as well as, in some embodiments, a code rate used by the radio access node when transmitting the information block and/or a transmit power used by the radio access node when transmitting the information block. Based on this determined information, the wireless device determines the amount of resources (e.g., number or repetitions) to be used by the wireless device when transmitting a random access signal for a random access procedure. In this manner, the amount of resources to be used by the wireless device when transmitting the random access signal is determined based on a reliable indicator of the coverage scenario of the wireless device.

In general, for 3GPP LTE, a UE is required to read the MIB, SIB1, and SIB2 in order to acquire information needed for executing a random access procedure. A dedicated MTC-SIB for MTC devices may be used, by which the MTC device may only have to read the MIB and the MTC-SIB. For example, LTE Release 13 includes such a new MTC-SIB, denoted SystemInformationBlockType1-BR which is possible to receive by a bandwidth reduced (MTC) device, and whose scheduling in time and frequency can be determined by decoding the MIB. According to some embodiments of the present disclosure, instead of using RSRP- or cell detection-based metrics that are fuzzy, the number of PBCH blocks and/or MTC-SIB/SIB1 redundancy versions needed for successful decoding of the essential information for the random access procedure may be used as a proxy of the radio conditions under which the UE is operating. Hence, if more involved decoding is needed for detecting the MTC-SIBs, this is an indication that the received signal is at a low received signal level, and hence an indication of a larger path loss. In this way, the number of resources (e.g., PBCH blocks and/or redundancy versions) needed to successfully decode the MTC-SIB is a good and reliable indicator of the coverage scenario and thus the number of PRACH repetitions that are needed. As different network operators are using different code rates for broadcasts (exception: MIB), and different network nodes may belong to different power classes, the wireless device may or must need to take code rate and downlink transmit power into account.

UE vendors and MTC device vendors have a natural incentive to maintain a good decoder performance since otherwise:

Decoding performance (e.g., Viterbi for PBCH and Physical Downlink Control Channel (PDCCH), and Turbo decoder for Physical Downlink Shared Channel (PDSCH) would not suffice for fulfilling throughput requirements which generally are much tighter than Radio Resource Management (RRM) requirements.

Substandard decoder performance means that more radio time is needed (more blocks, more redundancy versions), and radio activity is the largest single source of power drainage in a modem. Power consumption is a very important Key Performance Indicator (KPI) and hence UE and MTC vendors will optimize the decoder for good performance using minimal radio time.

This means that by using the number of PBCH blocks and/or SIB redundancy versions as a proxy for the operating point with respect to coverage, one gets a much more reliable classification that additionally is comparable between devices regardless of the actual UE implementation.

In some embodiments, the network node is using a particular Modulation and Coding Scheme (MCS) to provide a sufficient robustness of broadcasted information for wireless devices in its intended coverage area to be able to receive and decode the information. Code rate is the net ratio between the actual information bits and the total number of bits comprising both information bits (systematic bits) and redundant bits (parity bits) after rate matching, which may comprise puncturing and/or repetition of the encoded information. Modulation determines the number of bits carried by an individual resource element, where for instance 2, 4, and 6 bits are carried per resource element when using Quadrature Phase Shift Keying (QPSK), 16 Quadrature Amplitude Modulation (16QAM), and 64QAM, respectively. The more bits carried by a resource element, the more sensitive it becomes to interference and noise.

MIBs and SIBs are broadcasted using repetition schemes where, for the former, a minimum of four PBCH blocks are transmitted over a 40 millisecond (ms) Transmit Time Interval (TTI) and, for the latter, four redundancy versions are transmitted over a 80 ms TTI. The MIB changes every TTI due to increments of a System Frame Number (SFN) counter value hence conventional MIB decoders (e.g., a circular Viterbi decoder) can only combine information from the same TTI. Newer MIB decoders may be able to combine information also across TTIs and thus have no restrictions on how many blocks to combine, or may support more dense repetition schemes than used for PBCH up to and including 3GPP E-UTRA Network (E-UTRAN) Release12.

Neither the other information carried in the MIB nor the information carried in SIB1 and SIB2 is allowed to change except at boundaries of a so called System Information (SI) modification period which at minimum is 640 ms. Hence, SIB1 and SIB2 can be combined over several TTIs as long as one is not passing a SI modification window. And even doing so, there is a large likelihood that there has not been any change, and the wireless device can attempt to combine that information with the previously acquired information.

In favorable conditions it may be sufficient to use only a few repetitions to successfully decode the broadcasted information, whereas in worse conditions, more repetitions may be needed.

Network nodes may belong to different power classes, where nodes with macro coverage (cell radius of several kilometers) usually have much higher transmission power than, e.g., a node providing a pico cell (tens to hundreds of meters). Hence, a wireless device receiving a weak signal from a pico node might be more successful in communicating with the pico node than if the same weak signal has been received from a macro node, since in the latter case the low power of the received signal is due to attenuation (path loss, coupling loss) from the radio propagation (received power is generally decreasing by between $r^{-2}$ and $r^{-3}$ with distance r from the source due to scattering) and not due to using a lower downlink transmit power.

Some embodiments of this disclosure are related to finding the robustness (e.g., repetitions, resources) needed when a wireless device is to conduct random access towards a network node. As is apparent from the description above, it may not be or is not sufficient to only look at the number of redundancy versions/repetitions needed for the successful decoding to determine the uplink radio conditions; one may also have to look at the code rate and the downlink transmit power.

Moreover, a goal of some disclosed embodiments is to find a balance where the wireless device does not waste power, since particularly for MTC it is foreseen that a vast number of devices are to be battery operated. Hence, some disclosed embodiments are also about autonomous tuning of the robustness used by the wireless device when carrying out random access. Particularly, the wireless device is accumulating statistics on the number of repeated random access procedures needed for reaching the network node and may apply two thresholds on the statistics:

An upper threshold 1, which when exceeded indicates that the wireless device shall increase the robustness of the PRACH preamble, e.g. by increasing the repetitions or otherwise using more resources (and/or increasing uplink transmit power); and/or A lower threshold 2, which when below it the wireless device shall reduce the robustness of the PRACH preamble, e.g. by lowering the repetitions (and/or decreasing uplink transmit power).

Hence, the wireless device is using a hysteresis such that it becomes more conservative to reduce the robustness than to increase it.

Some embodiments of this disclosure can readily be extended to handle densification of PBCH transmissions, new MTC-SIBs (replacing, e.g., SIB1 and SIB2), new repetition schemes, etc., and hence is not limited to the current revisions of 3GPP E-UTRAN, although the embodiments below are described in a context of 3GPP E-UTRA Release12 and low-cost MTC in EC introduced for Release13.

The embodiments detailed herein describe mechanisms for selection of a random access (e.g., PRACH) repetition level for a wireless device operating in a communications network. As such, the embodiments detailed above provide methods, devices, and systems that operate to enhance coverage in a communications network.

Figure 2:
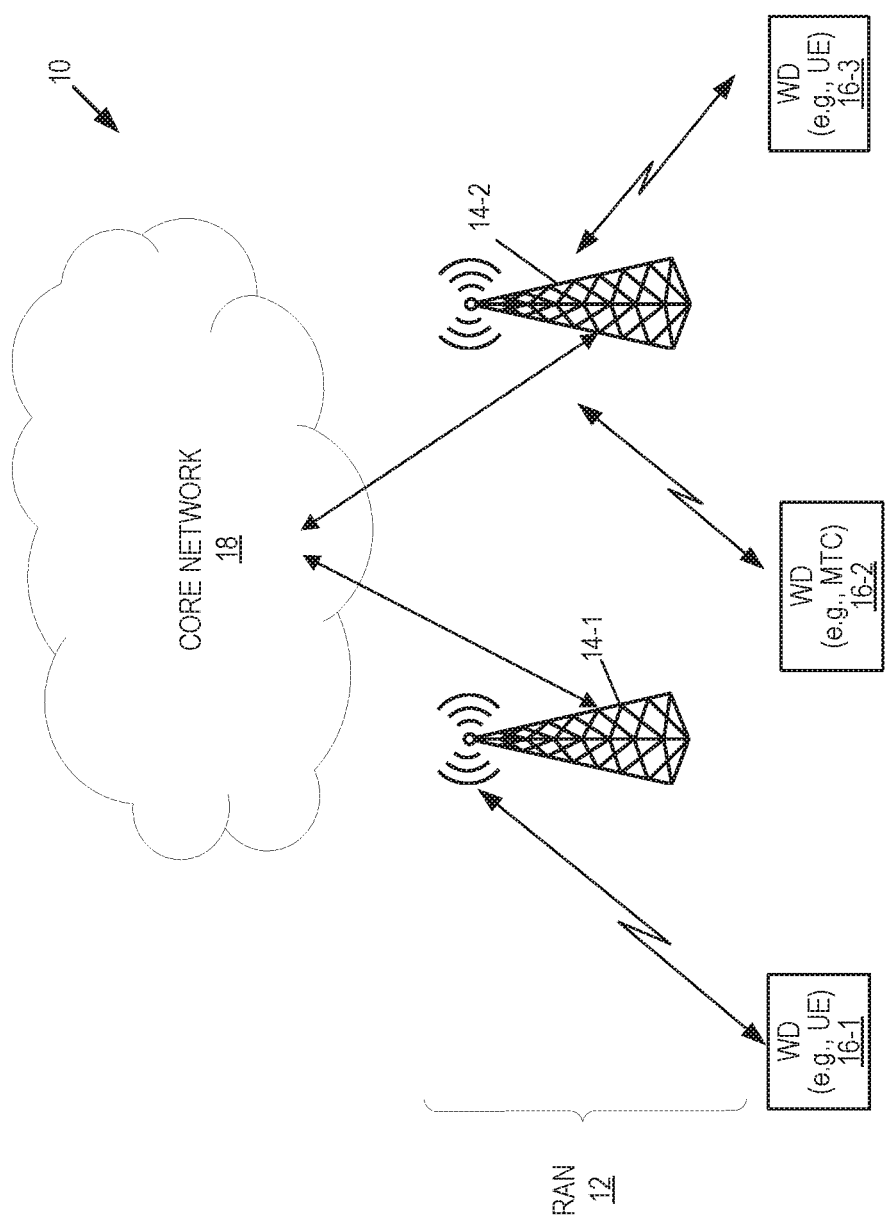
FIG. 2 illustrates one example of a cellular communications network in which embodiments of the present disclosure may be implemented.

FIG. 2 illustrates a cellular communications network 10 according to some embodiments of the present disclosure. In some embodiments, the cellular communications network 10 is a LTE (i.e., LTE or LTE-A) cellular communications network. As such, LTE terminology is oftentimes used throughout this disclosure. However, the concepts and embodiments disclosed herein are not limited to LTE and may be utilized in any suitable type of cellular or wireless network.

As illustrated, the cellular communications network 10 includes a Radio Access Network (RAN) 12 including a number of base stations 14-1 and 14-2 (generally referred to herein collectively as base stations 14 and individually as base station 14), which are more generally referred to herein as radio access nodes. The base stations 14 provide wireless access to wireless devices 16-1 through 16-3 (generally referred to herein collectively as wireless devices 16 and individually as wireless device 16) within coverage areas (e.g., cells) of the base stations 14. The base stations 14 are connected to a core network 18. Note that while only two base stations 14 and three wireless devices 16 are illustrated in this example for clarity and ease of discussion, the cellular communications network 10 may include many base stations 14 serving many wireless devices 16. In LTE terminology, the wireless devices 16 are referred to as UEs, and the base stations 14 are referred to as eNBs. While in this embodiment the base stations 14 are macro base stations, the RAN 12 may include a mixture of macro base stations and lower power base stations (i.e., pico base stations, femto base stations, home eNBs, etc.). The wireless devices 16 may communicate directly with the base station 14 as shown in FIG. 2, or via an intermediate node, such as a relay, a repeater, or another wireless device operating in a Device-to-Device (D2D) communication mode. In some embodiments, at least some of the wireless devices 16 are MTC devices that perform M2M communication. Some examples of MTC devices are smart meters, signboards, cameras, remote sensors, laptops, and appliances. In this example, the wireless device 16-2 is a MTC device.

The wireless devices 16, or at least the wireless devices 16 that are capable of M2M communication (i.e., the MTC devices), are configured to operate in either a normal mode of operation or an EC mode of operation. In some embodiments, the normal mode and the EC mode are two different modes where, in the EC mode, the wireless device 16 is configured to maintain communication (i.e., uplink and/or downlink) with the cellular communications network 10 (via one of the base stations 14) in an enhanced manner (e.g., over an extended range) as compared to that in the normal mode. The extended range is a range beyond which communication between the wireless device 16 and a corresponding base station 14 would normally be difficult or impossible.

Notably, while MTC devices are referred to herein, the concepts disclosed herein are applicable to low-complexity wireless devices (e.g., low-complexity UEs) or more generally to wireless devices (e.g., UEs).

Figure 3:
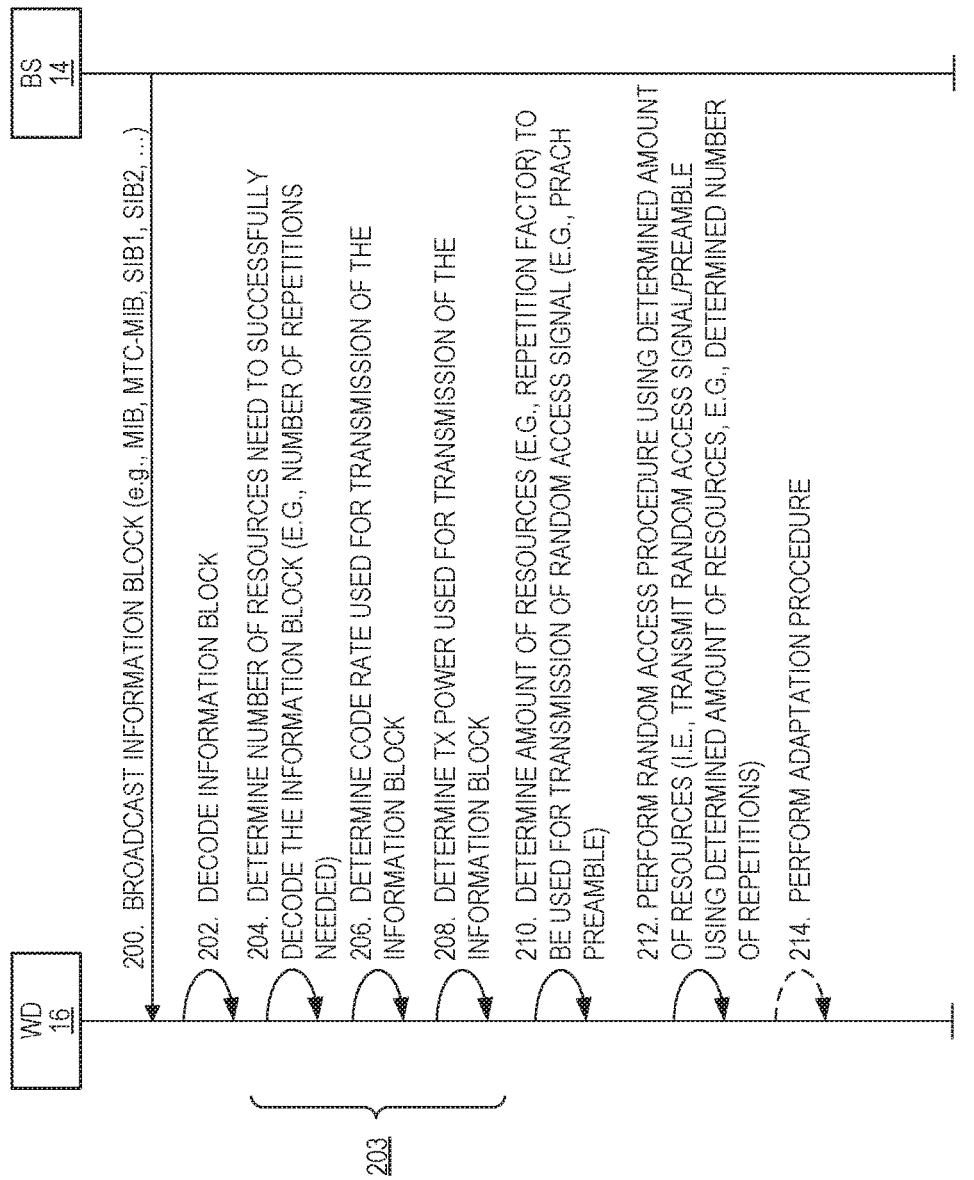
FIG. 3 illustrates the operation of a wireless device and a radio access node to perform a random access procedure in which the wireless device selects a repetition strategy for transmission of a random access signal based on a number of parameter values that are indicative of a coverage scenario or radio conditions for the wireless device according to some embodiments of the present disclosure.

FIG. 3 illustrates the operation of a wireless device 16 (e.g., the wireless device 16-2 that performs MTC) and a base station 14 of FIG. 2 according to some embodiments of the present disclosure. As illustrated, the base station 14 broadcasts one or more information blocks (step 200). As discussed above, the information block(s) may include a MIB, a SIB(s) (e.g., SIB1 and/or SIB2), and/or a MTC-SIB. The wireless device 16 decodes an information block (i.e., one (or possibly more) of the information blocks received from the base station 14) (step 202). The wireless device 16 then determines an amount of resources (e.g., number of Physical Resource Blocks (PRBs) or number of repetitions) to be used by the wireless device 16 when transmitting a random access signal for a random access procedure based on a determined coverage scenario of the wireless device (step 203). In some embodiments, this determination is made based on a mapping between one or more parameters and the amount of resources to be used. As discussed herein, the one or more parameters include a number of resources (e.g., number of PBCH blocks and/or number of repetitions) needed by the wireless device 16 to successfully decode the information block. Still further, in some embodiments, the one or more parameters additionally include a code rate used by the base station 14 when transmitting the information block and/or a transmit power used by the base station 14 when transmitting the information block.

More specifically, in some embodiments, in order to determine the amount of resources to be used by the wireless device 16 when transmitting the random access signal, the wireless device 16 determines the number of resources needed by the wireless device 16 to successfully decode the information block) (step 204). The number of resources needed by the wireless device 16 to successfully decode the information may be a number of PRBs, a number of PBCH blocks (which may be expressed as, e.g., an integer or non-integer number), and/or a number of repetitions. The number of repetitions may be the number of repetitions needed to successfully decode the information block, e.g., regardless of which redundancy version is used for each of those repetitions. Note that a "redundancy version" is a selected number of system and parity bits, and the redundancy versions used for multiple repetitions may or may not vary. The number of repetitions needed to successfully decode the information block may also be referred to as the number of redundancy versions needed; however, in this context, the number of redundancy versions is equivalent to the number of repetitions and the particular redundancy version used for each repetition may or may not vary.

The wireless device 16 also determines the code rate used by the base station 14 when transmitting the information block (step 206) and/or the transmit power used by the base station 14 when transmitting the information block (step 208). Note that, as an example, in the case where the information block is a SIB carried over PDSCH, the code rate can be deduced from the PDCCH that points out the PDSCH allocation. As another example, in the case where the information block is a MIB, the code rate is known in advance. Regarding transmit power, the transmit power may retrieved from, e.g., SIB2: RRC Radio Configuration Common, PDSCH: reference signal power, which specifies the Common Reference Signal (CRS) power in the range of −60 to 50 dBm/15 kilohertz (kHz).

The wireless device 16 determines the amount of resources (e.g., PRBs and/or repetitions) to be used by the wireless device 16 when transmitting the random access signal (e.g., PRACH preamble) for the random access procedure (step 210). This determination may be made based on mappings between different combinations of values of the parameters in steps 204-208 and corresponding amounts of resources (e.g., defined repetition levels) for transmitting the random access signal. These mappings may be, e.g., provided by the network (e.g., by the base station 14) and/or adaptively configured by the wireless device 16 based on, e.g., outcomes of one or more (e.g., multiple) instances of the random access procedure over time (e.g., based on statistics).

Further, the mapping may be via, e.g., a table (e.g., a look-up table) or may be via a function (e.g., a function that defines the amount of resources to be used as a function of a number of parameters that includes, e.g., the parameters determined in steps 204-208). The wireless device 16 performs the random access procedure using the determined amount of resources (step 212).

Performing the random access procedure includes transmitting the random access signal using the determined amount of resources. For example, looking back to FIG. 1, the PRACH preamble is transmitted using the determined amount of resources (e.g., repetitions) in step 100 rather than transmitted only once.

Optionally (as indicated by the dashed line), the wireless device 16 performs an adaptation procedure (step 214), in some embodiments. In general, the adaptation procedure adapts the manner in which the amount of resources is determined in step 210 in future iterations of the procedure based on the outcome of the random access procedure performed in step 212. For example, if over time the average number of bursts needed to successfully complete the random access procedure for a particular combination of parameter values (i.e., the values determined for the parameters in steps 204-208) is greater than a first threshold, then the mapping between the amount of resources used to transmit the random access signal and that combination of parameter values is updated to increase the amount of resources for that combination of parameter values. Likewise, if over time the average number of bursts needed to successfully complete the random access procedure for a particular combination of parameter values (i.e., the values determined for the parameters in steps 204-208) is less than a second threshold that is itself less than the first threshold, then the mapping between the amount of resources used to transmit the random access signal and that combination of parameter values is updated to decrease the amount of resources for that combination of parameter values. The adaptation may be performed by, e.g., changing values or relationships in a table (e.g., a look-up table) or changing the function or a parameter value(s) input into a function that defines the mapping.

Figure 4A:
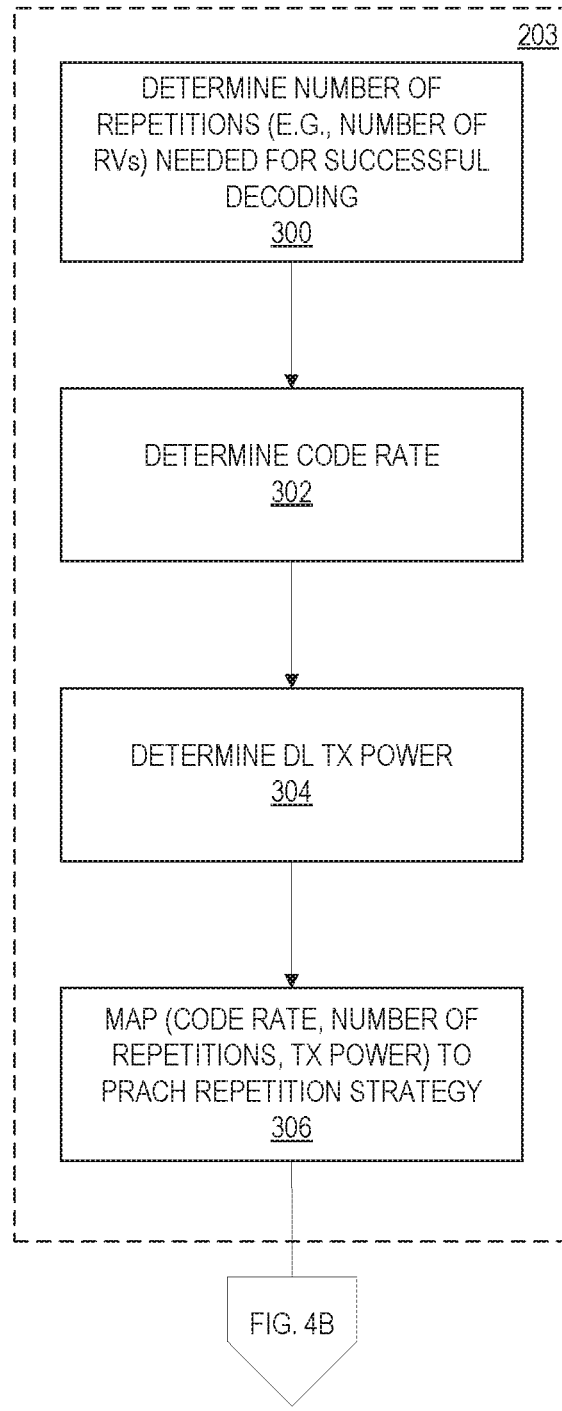
FIG. 4A is a flow chart that illustrates how a wireless device assesses radio and/or coverage conditions according to some embodiments of the present disclosure.
Figure 4B:
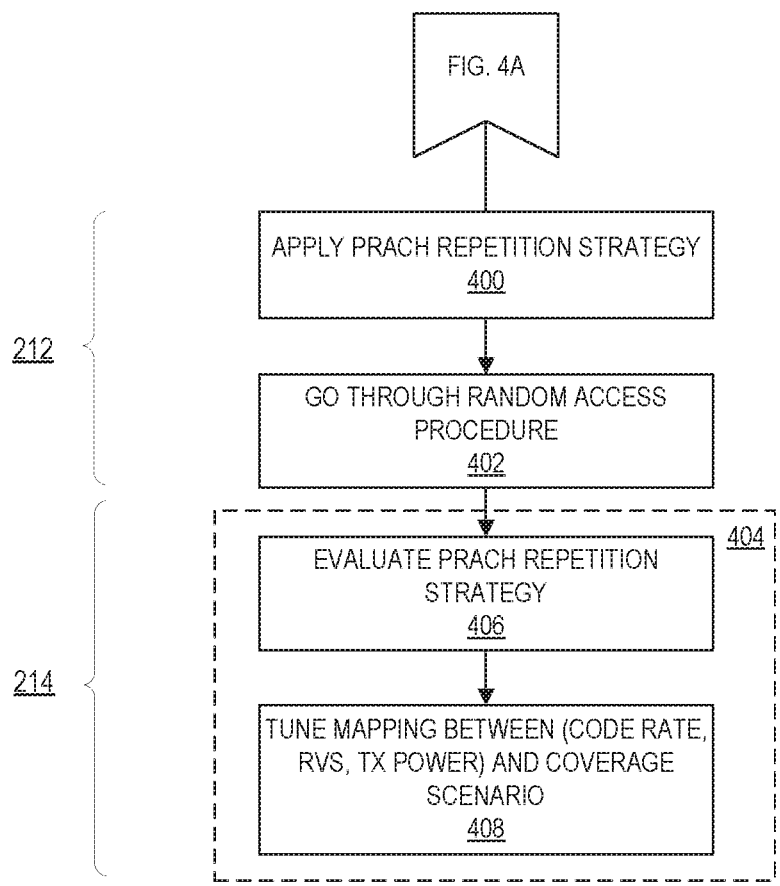
FIG. 4B is a flow chart that illustrates how a wireless device carries out random access with robustness according to some embodiments of the present disclosure.
Figure 4C:
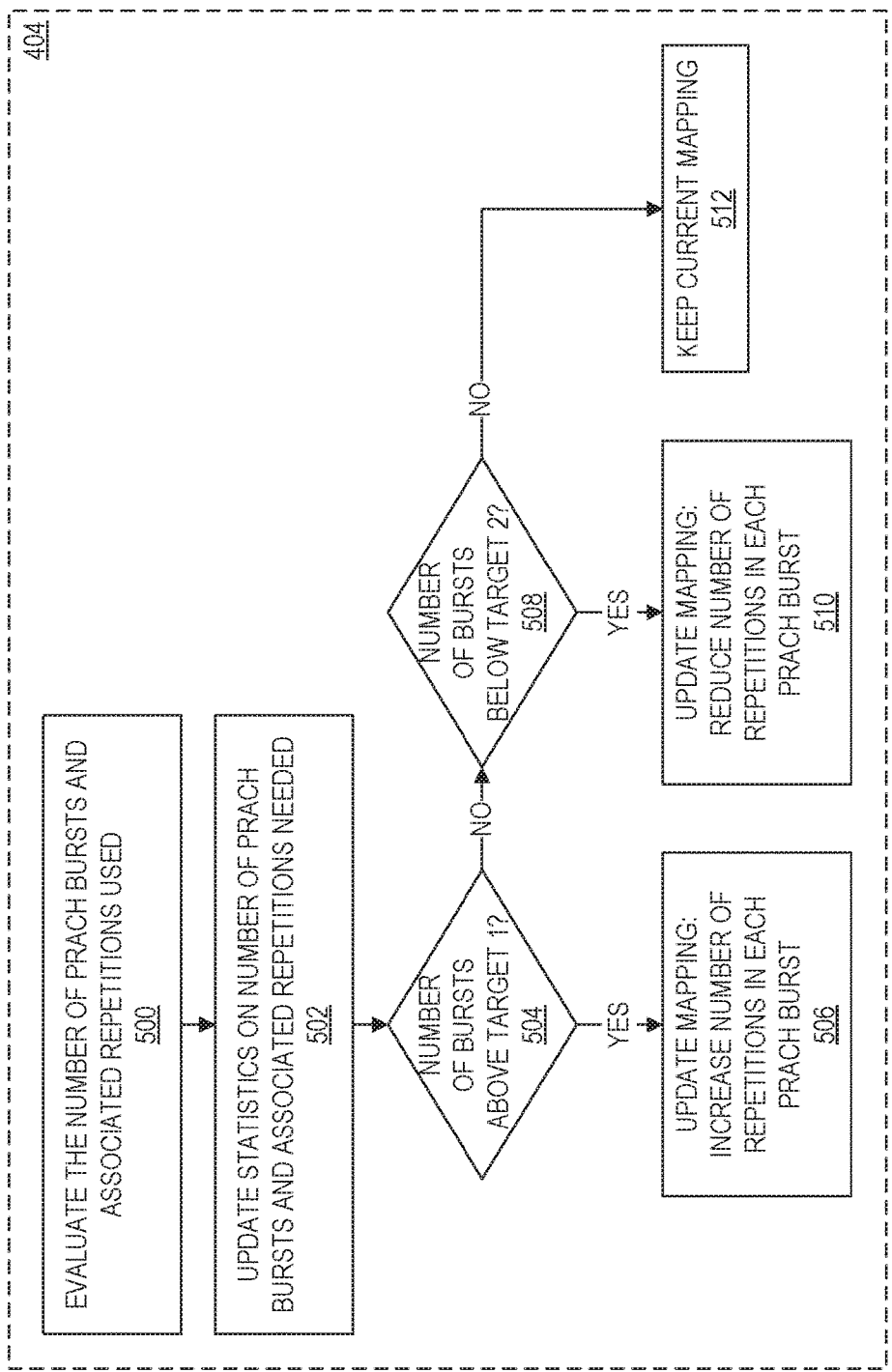
FIG. 4C is a flow chart that illustrates how a wireless device evaluates and tunes robustness of transmissions according to some embodiments of the present disclosure.

FIGS. 4A through 4C illustrate some example embodiments of the present disclosure. Embodiments include a method implemented in a device/UE (e.g., the wireless device 16) for determination of an amount of resources needed for transmission of a random access signal (e.g., a PRACH preamble on a PRACH channel) to a first remote network node (e.g., the base station 14).

In particular, FIG. 4A is a flow chart that illustrates step 203 of FIG. 3 in more detail according to some embodiments of the present disclosure. FIG. 4B is a flow chart that illustrates steps 212 and 214 of FIG. 3 in more detail according to some embodiments of the present disclosure. FIG. 4C is a flow chart that illustrates step 216 of FIG. 3 (and equivalently step 404 of FIG. 4B) in more detail according to some embodiments of the present disclosure.

In this regard, FIG. 4A is a flow chart that illustrates the operation of the wireless device 16 to assess the radio and/or coverage conditions and to determine, or select, the amount of resources to be used for transmission of the random access signal based on this assessment according to some embodiments of the present disclosure. As illustrated, the wireless device 16 assesses the radio and/or coverage conditions by looking at, for example, how many repetitions (e.g., how many redundancy versions) it has to receive in order to successfully decode an information block (e.g., MIB or MTC-SIB) received from a first remote network node (e.g., the base station 14) (step 300). In other words, the wireless device 16 determines the number of repetitions needed for successful decoding of the received information block. As such, the wireless device 16 determines the amount of information/coding needed for the device to successfully decode a received information block from the first remote network node. In some embodiments, the information block is a MIB and/or a MTC-SIB. In some embodiments, the amount of information/coding needed for a successful decoding is the number of PBCH blocks and/or MTC-SIB/SIB1 repetitions needed for successful decoding.

The wireless device 16 may also look at (i.e., determine) the code rate in use (step 302). In the case of SIBs carried over PDSCH, the code rate is deduced from the PDCCH that points out the PDSCH allocation. In the case of MIB, the code rate is prior known; however, from LTE Release 13 the network may optionally decide to introduce further repetitions of the PBCH transmitted from a base station 14, thereby reducing the code rate. These PBCH repetitions in LTE Release 13 are based on fractions (approximately ¼) of a PBCH block, and therefore the number of repetitions used by a wireless device in the decoding can correspond to a non-integer or an integer number. As such, the code rate may be taken into account by the wireless device 16.

The wireless device 16 may also look at (i.e., determine) downlink transmit power (step 304), as retrieved from SIB2: RRC, PDSCH: reference signal power, which specifies the CRS power in the range of −60 to 50 dBm/15 kHz. As such, the downlink transmit power may be taken into account by the wireless device 16.

Using the acquired information, the wireless device 16 determines the applicable conditions and the robustness needed for the uplink communication (i.e., the transmission of the random access signal) (step 306). In particular, in the illustrated example, the wireless device 16 maps the determined values of the parameters (i.e., determined number of resources (e.g., repetitions) needed to successfully decode the information block, the code rate, and the downlink transmit power) to a random access (e.g., PRACH) repetition strategy (i.e., the amount of resources (e.g., number of repetitions)) to be used for transmission of the random access signal. As such, based on the amount of information/coding needed to successfully decode the information block as well as the code rate and the downlink transmit power used for transmission of the information block, the wireless device 16 may determine the amount of resources needed for transmission of the random access signal (uplink channel). In some embodiments, the amount of resources is a repetition factor and/or a number of PRBs needed for the random access (uplink) signal (a generalization).

When determining the conditions, the wireless device 16 may, for instance, normalize the robustness on the downlink by calculating the accumulated downlink transmit power per received information bit needed for successful decoding. Such metrics incorporate code rate, modulation order, and number of repetitions used. The calculation may comprise multiplying the signaled downlink transmit power with the total number of received resource elements for the particular channel (e.g., PBCH, SIB1, and SIB2 on PDSCH, or any combination of these), giving a total energy for all repetitions/redundancy versions, and then dividing this total amount of energy with the net number of information bits received. There are several possible ways in which this calculation may be carried out. As one non-limiting example, the number of PRACH repetitions $N_{PRACH}$ to use for the initial random access preamble transmission is, in some embodiments, calculated as $$N_{PRACH} = [N_{RE,SIB1}/TBS_{SIB1} \cdot 10^{EPRE/10} \cdot k_0]$$

where $N_{RE,SIB1}$ is the total number of resource elements used when receiving SIB1 on PDSCH, $TBS_{SIB1}$ is the number of information bits in SIB1, and EPRE is the PDSCH Energy per Resource Element (EPRE) in dBm, corresponding to the reference signal power, which is transmitted to the wireless device 16 as part of the SI. $k_0$ is a normalization constant that may be signaled to the wireless device 16 as part of the SI, or it may be derived from a standardization document. $k_0$ may further comprise additional calculations, for example including a (known, signaled, assumed, or estimated) offset between the power used for the data signal (e.g., on PDSCH) and the signaled reference signal power. It may alternatively or additionally include the used wireless device transmit power. This should typically be set to maximum in an EC scenario, but this may be different for different wireless devices 16, for example wireless devices 16 belonging to different power classes, or wireless devices 16 with otherwise restricted output power.

Instead of an explicit formula, the number of repetitions can, in some embodiments, be deduced or obtained from a look-up table. The transmit power of the network node can in one such embodiment be classified according to the base station class employed. For example, a pico base station transmits with lower output power, which implies that for a given number of required repetitions of a downlink message, fewer repetitions would be required in uplink transmissions, such as the random access preamble.

It may be advantageous for the network node receiver (e.g., the receiver of the base station 14) if not any arbitrary number of preamble repetitions can be used, but the number of repetitions is restricted to a set of allowed values. Consequently, the number of preamble repetitions to use by a wireless device 16 may be selected from this set of allowed values, for example by choosing the smallest number larger than $N_{PRACH}$, or the largest number smaller than $N_{PRACH}$, or the one which is closest to than $N_{PRACH}$ in absolute or relative terms.

FIG. 4B is a flow chart that illustrates the operation of the wireless device 16 to perform the random access procedure using the determined amount of resources and to perform adaptation according to some embodiments of the present disclosure. As shown, steps 400-408 illustrate how the wireless device 16 carries out random access with robustness determined from the detected propagation conditions, evaluates the success of the procedure, and if necessary tunes the mapping between detected propagation conditions and uplink robustness and/or uplink transmit power level. The wireless device 16 applies the determined PRACH repetition strategy (step 400). In doing so, in some embodiments, the wireless device 16 uses, e.g., one out of several pre-configured or broadcasted repetition levels of PRACH in a burst. Notably, as used herein, a burst refers to the transmission of the random access signal (e.g., PRACH preamble) at the particular repetition level. In this manner, the wireless device 16 transmits the random access signal using the determined amount of resources (e.g., the determined number of repetitions). The wireless device 16 then carries out, or continues, the full random access procedure (step 402) which may include repetition of a next burst(s) until the wireless device 16 receives a response from the network node. The random access procedure may include increasing the number of repetitions in a burst and/or ramping up the uplink transmit power or other means for increasing the robustness until heard by the network node.

After the random access procedure is completed, the wireless device 16 optionally performs an adaptation procedure (step 404). In this example, the wireless device 16 evaluates whether the PRACH repetition strategy determined in step 306 of FIG. 4A and used when transmitting the random access signal in step 400 of FIG. 4B was sufficient for the detected propagation and/or coverage conditions (step 406). In other words, the wireless device 16 determines whether the initial repetition level determined in step 306 and used in step 400 and/or uplink transmit power level, otherwise the robustness, was sufficient for the detected propagation and/or coverage conditions. If needed, the wireless device 16 tunes the mapping between PRACH repetition strategy (e.g., amount of resources such as, e.g., number of repetitions) for transmission of the random access signal (i.e., the robustness) and the detected parameter values (i.e., the parameter values detected in steps 300-304 of FIG. 4A, which define propagation and/or coverage conditions) (step 408). In other words, the wireless device 16 tunes the mapping between the PRACH repetition strategy (e.g., the initial repetition level and/or uplink transmit power), otherwise the robustness, and the detected propagation and/or coverage conditions. As such, upon transmission, the wireless device 16 may evaluate the success of the determined amount of resources needed.

FIG. 4C is a flow chart that illustrates how a wireless device 16 evaluates and tunes robustness of transmissions according to some embodiments of the present disclosure. In particular, FIG. 4C illustrates step 404 of FIG. 4B in more detail according to some embodiments of the present disclosure. As illustrated, steps 500-512 show exemplary details of step 404 (which includes steps 406 and 408) of FIG. 4B, where the wireless device 16 evaluates and tunes the robustness of the uplink transmissions (i.e., the random access signal transmissions). The number of PRACH bursts and associated repetitions that have been used before a response is received from the network node are evaluated (step 500), and statistics on the number of PRACH bursts and associated repetitions needed before a response is received from the network are formed, or updated (step 502). The statistics comprise, for instance, the average number of PRACH bursts/retransmissions of the random access signal that are needed before receiving a random access response over the, say 20, last random access procedures. Here, the statistics are determined for a PRACH strategy (e.g., for a possible value for the number of repetitions used for transmission of the random access signal). Separate statistics may be maintained for each of a number of different PRACH strategies or, similarly, for each mapping between a combination of parameter values and PRACH strategy.

For a particular PRACH strategy, in case the average number of bursts is strictly higher than a threshold 1 ("target 1"), say 1.2 (step 504; YES), the wireless device 16 updates the mapping(s) that maps a particular combination(s) of parameter values to the PRACH strategy to increase the number of repetitions in the PRACH strategy for each PRACH burst (step 506). In some embodiments, the wireless device 16 increases the initial number of repetitions for the PRACH strategy to the next predetermined or signaled level, and/or increases the initial uplink transmit power used for the PRACH preamble, or otherwise increases the robustness of the initial transmission, in order to reduce the number of bursts needed for the coming random access attempts for which the PRACH strategy is used. If, on the other hand, the average number of bursts needed when using the PRACH strategy is lower than threshold 1 (step 504; NO) but lower than or equal to a threshold 2 ("target 2"), say 1.0 (step 508; YES), the wireless device 16 instead updates the mapping(s) that maps a particular combination(s) of parameter values to the PRACH strategy to decrease the number of repetitions in the PRACH strategy for each PRACH burst (step 510). In some embodiments, the wireless device 16 reduces the initial number of repetitions for the PRACH strategy to the next lower repetition level and/or decreases the initial uplink transmit power, or otherwise decreases the robustness of the transmission of the initial PRACH preamble. In case the average is between thresholds 1 and 2 (step 508; NO), the wireless device 16 keeps the current mapping (step 512). As such, the wireless device 16 may modify the determination rule for determining the amount of resources to use when transmitting the random access signal based on the statistics such that the modification of the determination rule may be based on two thresholds where, if exceeding the first threshold, the wireless device 16 increases the number of resources to use, and where, if falling below the second threshold, the wireless device 16 decreases the number of resources to use. As indicated, the first and second thresholds may be the same or the first threshold may be higher than the second threshold. In cases where the second threshold is higher than the first threshold, step 508 will automatically evaluate to "YES," if step 504 evaluates to "NO," which implies that the mapping is always adjusted upwards or downwards as a result of the comparison with the first threshold. Note that the process of FIG. 4C is only an example (i.e., is non-limiting). The adaptation process may vary depending on the particular implementation.

Figure 5:
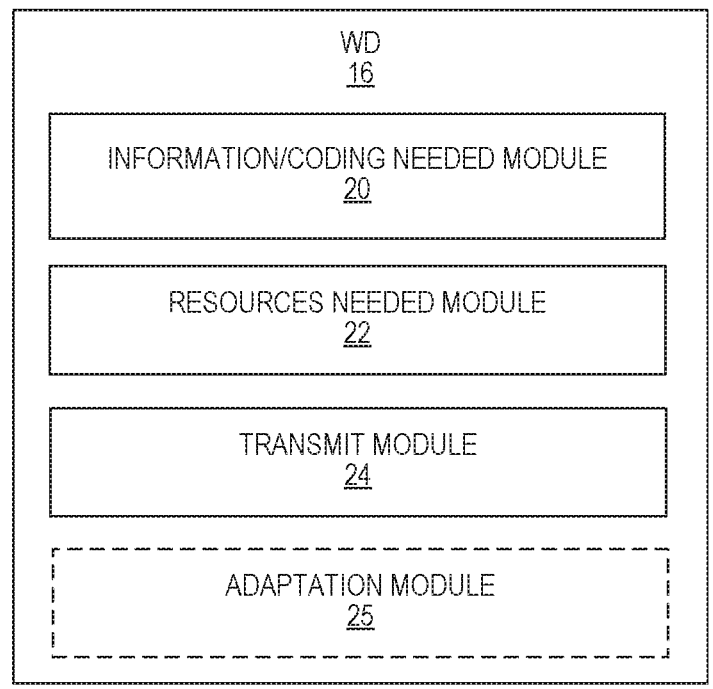
FIG. 5 is a block diagram that illustrates a wireless device according to some embodiments of the present disclosure.

FIG. 5 is a block diagram of a wireless device 16 according to some embodiments of the present disclosure. The wireless device 16 includes an information/coding needed module 20, a resources needed module 22, a transmit module 24, and optionally (i.e., in some embodiments) an adaptation module 25, each of which is implemented in software that is stored in a computer readable medium (e.g., memory) and executed by a processor of the wireless device 16. The information/coding needed module 20 is operative to determine the amount of information/coding needed for the wireless device 16 to successfully decode a received information block from a network node. The resources needed module 22 is operative to, based on the amount of information/coding needed to successfully decode the information block and, in some embodiments, the code rate and/or the downlink transmit power used for transmission of the information block, determine the amount of resources needed for transmission of the random access signal (uplink channel). The transmit module 24 is operative to transmit the random access signal using the determined amount of resources. The adaptation module 25 operates to, as described above, adapt the random access repetition strategy based on random access outcomes (e.g., as reflected by statistics such as average number of random access bursts needed to receive a response from the network).

Figure 6:
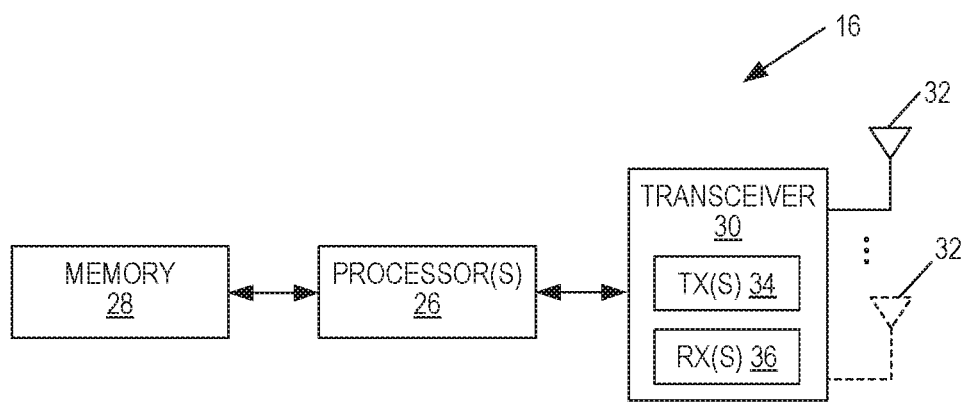
FIG. 6 is a block diagram that illustrates a wireless device according to some embodiments of the present disclosure.

FIG. 6 is a block diagram of a wireless device 16 according to some embodiments of the present disclosure. As illustrated, the wireless device 16 includes circuitry that operates to cause the wireless device 16 to implement the methods and functionality described herein. In one example, the circuitry can be in the form of processing circuitry, which may include one or more processors 26 (e.g., one or more Central Processing Units (CPUs), one or more Application Specific Integrated Circuits (ASICs), and/or one or more Field Programmable Gate Arrays (FPGAs)) and memory 28 containing instructions executable by the one or more processors 26 whereby the wireless device 16 operates according to any of the embodiments described herein. The wireless device 16 also includes a transceiver 30 and at least one antenna 32. The transceiver 30 includes one or more transmitters 34 and one or more receivers 36. The transceiver 30 includes various types of circuitry such as, for example, filters, mixers, amplifiers, etc.

In some embodiments, a computer program is provided including instructions which, when executed by the one or more processors 26, cause the one or more processors 26 to carry out the functionality of the wireless device 16 according to any one of the embodiments described herein is provided. In some embodiments, a carrier containing the aforementioned computer program product. The carrier is one of an electronic signal, an optical signal, a radio signal, or a computer readable storage medium (e.g., a non-transitory computer readable medium such as the memory 28).

Figure 7:
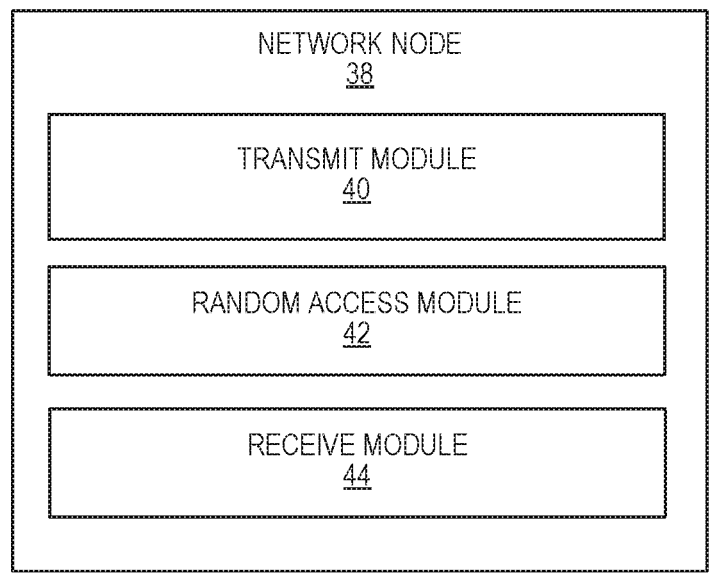
FIG. 7 is a block diagram that illustrates a network node in a wireless communications network according to some embodiments of the present disclosure.

FIG. 7 is a block diagram of a network node 38 according to some embodiments of the present disclosure. The network node 38 may be, for example, the base station 14. The network node 38 includes a transmit module 40, a random access module 42, and a receive module 44, each of which is implemented in software that is stored in a computer readable medium (e.g., memory) and executed by a processor of the network node 38. The transmit module 40 is operative to broadcast an information block(s) as described above (via an associated transmitter of the network node 38, which is not shown in FIG. 7). The random access module 42 is operative to perform the network-side aspects of the random access procedure in response to reception of the random access signal from the wireless device 16 by the receive module 44. Lastly, the receive module 44 is operative to receive the random access signal transmitted by the wireless device 16 in accordance with the determined amount of resources (via an associated receiver of the network node 38, which is not shown).

Figure 8:
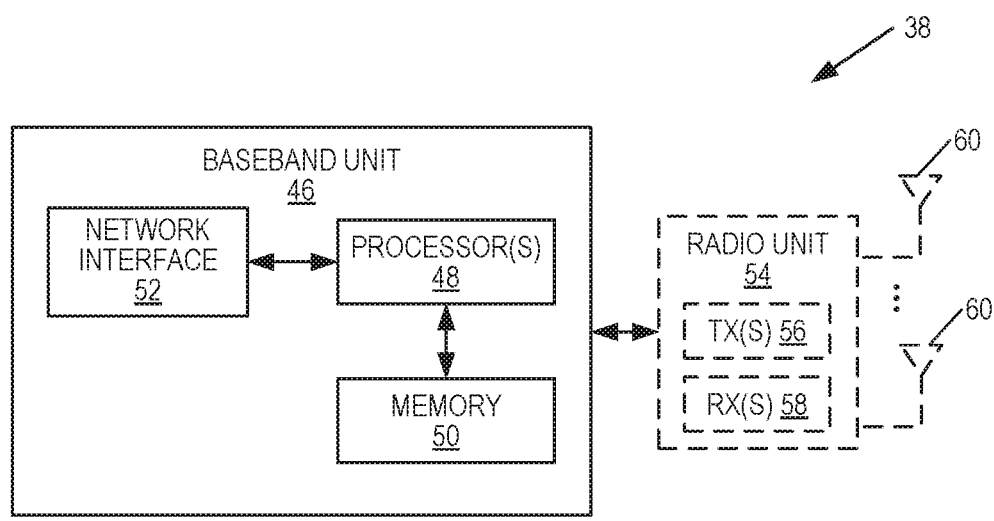
FIG. 8 is a block diagram that illustrates a network node in a wireless communications network according to some embodiments of the present disclosure.

FIG. 8 is a block diagram of a network node 38 according to some embodiments of the present disclosure. In some embodiments, the network node 38 is the base station 14, but may be any type of network node (e.g., a MME, a Serving Gateway (S-GW), a P-GW, etc.). As illustrated, the network node 38 includes circuitry that operates to cause the network node 38 to implement the methods and functionality described herein, particularly those described with respect to random access. In one example, the network node 38 includes a baseband unit 46 that includes processing circuitry which may include one or more processors 48 (e.g., one or more CPUs, one or more ASICs, and/or one or more FPGAs) and memory 50 containing instructions executable by the one or more processors 48 whereby the network node 38 operates according to any of the embodiments described herein. As illustrated, the network node 38 also includes a network interface 52, which allows the network node 38 to communicate with one or more additional network nodes in a wireless communications network. The network interface 52 may include one or more components (e.g., network interface card(s)) that connect the network node 38 to other systems.

If the network node 38 is a radio access node (e.g., a base station 14), the network node 38 also includes a radio unit 54, including one or more transmitters 56 and one or more receivers 58 coupled to one or more antennas 60. In some embodiments, the functionality of the network node 38 is implemented in software stored in the memory 50 for execution by the one or more processors 48. In some embodiments, the network node 38 may include additional components responsible for providing additional functionality, including any of the functionality identified above and/or any functionality necessary to support the solutions described above.

In some embodiments, a computer program is provided including instructions which, when executed by the one or more processors 48, cause the one or more processors 48 to carry out the functionality of the network node 38 (e.g., the functionality of the base station 14) according to any one of the embodiments described herein. In one embodiment, a carrier containing the aforementioned computer program product is provided. The carrier is one of an electronic signal, an optical signal, a radio signal, or a computer readable storage medium (e.g., a non-transitory computer readable medium such as the memory 50).

While various embodiments are described herein, some non-limiting, example embodiments are as follows.

The present disclosure provides methods, devices, and systems for selection of a PRACH repetition level for a wireless device operating in a communications network. In some embodiments, a method implemented in a device/UE (e.g., wireless device) for determination of an amount of resources needed for transmission of a random access signal (uplink channel) to a first remote network node, comprises the steps of (a) determining the amount of information/coding needed for the device/UE to successfully decode a received information block from the first remote network node, (b) based on the amount of information/coding needed, determining the amount of resources needed for transmission of the random access signal (uplink channel), and (c) transmitting the random access signal using the determined amount of resources.

In some embodiments, the amount of resources is a repetition factor.

In some embodiments, the amount of resources is a number of PRBs needed for the uplink signal (a generalization).

In some embodiments, the information block is a MIB or MTC-SIB.

In some embodiments, the amount of information/coding needed for successfully decoding is the number of PBCH blocks and/or MTC-SIB/SIB1 redundancy versions needed for successful decoding.

In some embodiments, downlink transmit power is taken into account by the wireless device.

In some embodiments, uplink transmit power is taken into account by the wireless device.

In some embodiments, the difference (in logarithmic scale) or ratio (in linear scale) between the downlink and uplink transmit power is taken into account by the wireless device.

In some embodiments, the code rate is taken into account by the wireless device.

In some embodiments, upon transmission, the wireless device evaluates the success of the determined amount of resources needed.

In some embodiments, the wireless device keeps statistics of the outcome.

In some embodiments, the wireless device modifies the determination rule based on the statistics.

In some embodiments, the statistics express the average number of retransmissions/bursts needed for the network node to respond.

In some embodiments, the modification of the determination rule is based on two thresholds where, if exceeding the first threshold, the wireless device increases the number of resources to use and, if falling below a second threshold, the wireless device decreases the number of resources to use; the first and second thresholds being the same or the first threshold being lower than the second threshold.

Embodiments also include a device/UE (e.g., wireless device) that comprises processor(s) and memory containing instructions executable by the processor(s) such that the device/UE is operative to determine an amount of resources needed for transmission of a random access signal (uplink channel) to a first remote network node. The device/UE is operative to (a) determine the amount of information/coding needed for the device/UE to successfully decode a received information block from the first remote network node, (b) based on the amount of information/coding needed, determine the amount of resources needed for transmission of the random access signal (uplink channel), and (c) transmit the random access signal using the determined amount of resources.

Embodiments also include a computer program comprising instructions which, when executed by at least one processor, cause the at least one processor to carry out functionality of a device/UE (e.g., wireless device) for determining an amount of resources needed for transmission of a random access signal (uplink channel) to a first remote network node. The computer program comprises instructions to perform the steps of (a) determining the amount of information/coding needed for the device/UE to successfully decode a received information block from the first remote network node, (b) based on the amount of information/coding needed, determining the amount of resources needed for transmission of the random access signal (uplink channel), and (c) transmitting the random access signal using the determined amount of resources.

The following acronyms are used throughout this disclosure.

3GPP Third Generation Partnership Project
5G Fifth Generation
ASIC Application Specific Integrated Circuits
CE Coverage Enhancement
CN Core Network
CPU Central Processing Unit
CRS Common Reference Signal
D2D Device-to-Device
dB Decibel
dBm Decibel-Milliwatts
DL-SCH Downlink Shared Channel
EC Enhanced Coverage
eNB Evolved, or Enhanced, Node B
EPRE Energy per Resource Element
E-UTRA Evolved Universal Terrestrial Radio Access
E-UTRAN Evolved Universal Terrestrial Radio Access Network
FPGA Field Programmable Gate Arrays
HARQ Hybrid Automatic Repeat Request
HD-FDD Half-Duplex Frequency Division Duplex
kHz Kilohertz
KPI Key Performance Indicator
LTE Long Term Evolution
LTE-A Long Term Evolution Advanced
M2M Machine-to-Machine
MCS Modulation and Coding Scheme
MHz Megahertz
MIB Master Information Block
MME Mobility Management Entity
ms Millisecond
MTC Machine Type Communication
MTC-EC Machine Type Communication-Enhanced Coverage
MTC-SIB Machine Type Communication-System Information Block
PBCH Physical Broadcast Channel
PDCCH Physical Downlink Control Channel
PDN Packet Data Network
PDSCH Physical Downlink Shared Channel
PHICH Physical HARQ Indication Channel
P-GW Packet Data Network Gateway
PRACH Physical Random Access Channel
PRB Physical Resource Block
QAM Quadrature Amplitude Modulation
QPSK Quadrature Phase Shift Keying
RAN Radio Access Network
RF Radio Frequency
RRC Radio Resource Control
RRM Radio Resource Management
RSRP Reference Signal Received Power
SCEF Service Capability Exposure Function
SFN System Frame Number
S-GW Serving Gateway
SI System Information
SIB System Information Block
SI-RNTI System Information Radio Network Temporary Identifier
SINR Signal-to Interference plus Noise Ratio
SNR Signal-to-Noise Ratio
TS Technical Specification
TTI Transmit Time Interval
UE User Equipment
WTRU Wireless Transmit/Receive Unit Those skilled in the art will recognize improvements and modifications to the embodiments of the present disclosure. All such improvements and modifications are considered within the scope of the concepts disclosed herein and the claims that follow.

What is claimed is:

1. A method of operation of a wireless device for random access to a cellular communications network, comprising:
 determining a number of resources needed for the wireless device to successfully decode an information block received from a radio access node of the cellular communications network;
 determining at least one of: (a) a code rate used for transmission of the information block by the radio access node and (b) a transmit power used by the radio access node for transmission of the information block;
 determining an amount of resources to be used by the wireless device when transmitting a random access signal for a random access procedure based on: (i) the number of resources needed for the wireless device to successfully decode the information block and (ii) the at least one of: (a) the code rate used for transmission of the information block by the radio access node and (b) the transmit power used by the radio access node for transmission of the information block; and
 performing the random access procedure, wherein performing the random access procedure comprises transmitting the random access signal using the amount of resources determined to be used by the wireless device when transmitting the random access signal for the random access procedure.

2. The method of claim 1 wherein:
 determining the at least one of: (a) the code rate used for transmission of the information block by the radio access node and (b) the transmit power used by the radio access node for transmission of the information block comprises determining the code rate used for transmission of the information block by the radio access node; and
 determining the amount of resources to be used by the wireless device when transmitting the random access signal for the random access procedure comprises determining the amount of resources to be used by the wireless device when transmitting the random access signal for the random access procedure based on: (i) the number of resources needed for the wireless device to successfully decode the information block and (ii) the code rate used for transmission of the information block by the radio access node.

3. The method of claim 1 wherein:
 determining the at least one of: (a) the code rate used for transmission of the information block by the radio access node and (b) the transmit power used by the radio access node for transmission of the information block comprises determining the transmit power used by the radio access node for transmission of the information block; and
 determining the amount of resources to be used by the wireless device when transmitting the random access signal for the random access procedure comprises determining the amount of resources to be used by the wireless device when transmitting the random access signal for the random access procedure based on: (i) the number of resources needed for the wireless device to successfully decode the information block and (ii) the transmit power used by the radio access node for transmission of the information block.

4. The method of claim 1 wherein:
 determining the at least one of: (a) the code rate used for transmission of the information block by the radio access node and (b) the transmit power used by the radio access node for transmission of the information block comprises:
  determining the code rate used for transmission of the information block by the radio access node; and
  determining the transmit power used by the radio access node for transmission of the information block; and
 determining the amount of resources to be used by the wireless device when transmitting the random access signal for the random access procedure comprises determining the amount of resources to be used by the wireless device when transmitting the random access signal for the random access procedure based on: (i) the number of resources needed for the wireless device to successfully decode the information block and (ii) both (a) the code rate used for transmission of the information block by the radio access node and (b) the transmit power used by the radio access node for transmission of the information block.

5. The method of claim 1 wherein the amount of resources to be used by the wireless device comprises a number of Physical Resource Blocks, PRBs, to be used by the wireless device when transmitting the random access signal for the random access procedure.

6. The method of claim 1 wherein the amount of resources to be used by the wireless device comprises a number of repetitions to be used by the wireless device when transmitting the random access signal for the random access procedure.

7. The method of claim 1 wherein the information block is a Master Information Block, MIB.

8. The method of claim 1 wherein the information block is an information block that comprises system information.

9. The method of claim 1 wherein the number of resources needed for the wireless device to successfully decode the information block comprises a number of repetitions of the information block needed to successfully decode the information block.

10. The method of claim 1 wherein the number of resources needed for the wireless device to successfully decode the information block comprises a number of Physical Broadcast Channel, PBCH, blocks needed to successfully decode the information block.

11. The method of claim 1 wherein the number of resources needed for the wireless device to successfully decode the information block comprises a number of repetitions of the information block and a number of Physical Broadcast Channel, PBCH, blocks needed to successfully decode the information block.

12. The method of claim 1 wherein the amount of resources determined to be used by the wireless device when transmitting the random access signal for the random access procedure comprises a number of repetitions, and the method further comprises:
 applying the number of repetitions to thereby transmit the random access signal at a corresponding repetition level; and
 continuing the random access procedure until a random access response is received.

13. The method of claim 1 wherein determining the amount of resources to be used by the wireless device when transmitting the random access signal for the random access procedure comprises determining the amount of resources to be used by the wireless device when transmitting the random access signal for the random access procedure based on a mapping from (I) the number of resources needed to successfully decode the information block and the at least one of the code rate and the transmit power to (II) the amount of resources to be used by the wireless device when transmitting the random access signal for the random access procedure.

14. The method of claim 13 further comprising performing an adaptation procedure that adapts the mapping based on an outcome of one or more instances of the random access procedure.

15. The method of claim 14 wherein performing the adaptation procedure comprises increasing the number of resources for the mapping upon determining that an average number of retransmissions needed to receive a random access response is greater than a first predefined threshold.

16. The method of claim 14 wherein performing the adaptation procedure comprises decreasing the number of resources for the mapping upon determining that an average number of retransmissions needed to receive a random access response is less than a second predefined threshold.

17. The method of claim 1 wherein the wireless device is a User Equipment device, UE, or a Machine Type Communication, MTC, device.

18. A wireless device for a cellular communications network, comprising:
   a transceiver;
   one or more processors; and
   memory that stores software executable by the one or more processors whereby the wireless device is operable to:
      determine a number of resources needed for the wireless device to successfully decode an information block received from a radio access node of the cellular communications network via the transceiver;
      determine at least one of: (a) a code rate used for transmission of the information block by the radio access node and (b) a transmit power used by the radio access node for transmission of the information block;
      determine an amount of resources to be used by the wireless device when transmitting a random access signal for a random access procedure based on: (i) the number of resources needed for the wireless device to successfully decode the information block and (ii) the at least one of: (a) the code rate used for transmission of the information block by the radio access node and (b) the transmit power used by the radio access node for transmission of the information block; and
      perform the random access procedure, wherein performing the random access procedure comprises transmitting the random access signal using the amount of resources determined to be used by the wireless device when transmitting the random access signal for the random access procedure.

19. The wireless device of claim 18 wherein, by execution of the software by the one or more processors, the wireless device is further operable to transmit, via the transceiver, the random access signal using the amount of resources determined to be used by the wireless device when transmitting the random access signal for the random access procedure.

20. The wireless device of claim 18 wherein the wireless device determines the amount of resources to be used by the wireless device when transmitting the random access signal for the random access procedure based on a mapping from (I) the number of resources needed to successfully decode the information block and the at least one of the code rate and the transmit power to (II) the amount of resources to be used by the wireless device when transmitting the random access signal for the random access procedure.

21. The wireless device of claim 20 wherein, by execution of the software by the one or more processors, the wireless device is further operable to perform an adaptation procedure that adapts the mapping based on an outcome of one or more instances of the random access procedure.

22. A wireless device for a cellular communications network, comprising:
   means for determining a number of resources needed for the wireless device to successfully decode an information block received from a radio access node of the cellular communications network;
   means for determining at least one of: (a) a code rate used for transmission of the information block by the radio access node and (b) a transmit power used by the radio access node for transmission of the information block;
   means for determining an amount of resources to be used by the wireless device when transmitting a random access signal for a random access procedure based on: (i) the number of resources needed for the wireless device to successfully decode the information block and (ii) the at least one of: (a) the code rate used for transmission of the information block by the radio access node and (b) the transmit power used by the radio access node for transmission of the information block; and
   means for performing the random access procedure, wherein performing the random access procedure comprises transmitting the random access signal using the amount of resources determined to be used by the wireless device when transmitting the random access signal for the random access procedure.

23. A non-transitory computer-readable medium storing software instructions that when executed by one or more processors of a wireless device for a cellular communications network instruct the wireless device to:
   determine a number of resources needed for the wireless device to successfully decode an information block received from a radio access node of the cellular communications network;
   determine at least one of: (a) a code rate used for transmission of the information block by the radio access node and (b) a transmit power used by the radio access node for transmission of the information block; and
   determine an amount of resources to be used by the wireless device when transmitting a random access signal for a random access procedure based on: (i) the number of resources needed for the wireless device to successfully decode the information block and (ii) the at least one of: (a) the code rate used for transmission of the information block by the radio access node and (b) the transmit power used by the radio access node for transmission of the information block.

* * * * *

UNITED STATES PATENT AND TRADEMARK OFFICE
CERTIFICATE OF CORRECTION

PATENT NO. : 10,123,356 B2
APPLICATION NO. : 15/134861
DATED : November 6, 2018
INVENTOR(S) : Axmon et al.

Page 1 of 1

It is certified that error appears in the above-identified patent and that said Letters Patent is hereby corrected as shown below:

In the Specification

In Column 11, Line 42, delete "$\hat{E}s/\text{lot} \leftarrow 6$" and insert -- $\hat{E}s/\text{lot} < -6$ --, therefor.

In Column 13, Line 5, delete "PRAACH" and insert -- PRACH --, therefor.

In Column 14, Lines 48-52, delete "Downlink Control Channel...............(RRM) requirements." and insert the same at Lines 46-47, after "Physical" as a continuation sub-point.

In Column 18, Lines 12-13, delete "may retrieved" and insert -- may be retrieved --, therefor.

Signed and Sealed this
Twenty-first Day of May, 2019

Andrei Iancu
*Director of the United States Patent and Trademark Office*